Sept. 24, 1957 A. OXAAL 2,807,669

AUTOMATIC TELEPHONE SYSTEM

Filed May 12, 1950 9 Sheets-Sheet 1

INVENTOR.
ARNE OXAAL

BY Brown, Jackson, Boettcher & Dienner

ATTORNEYS

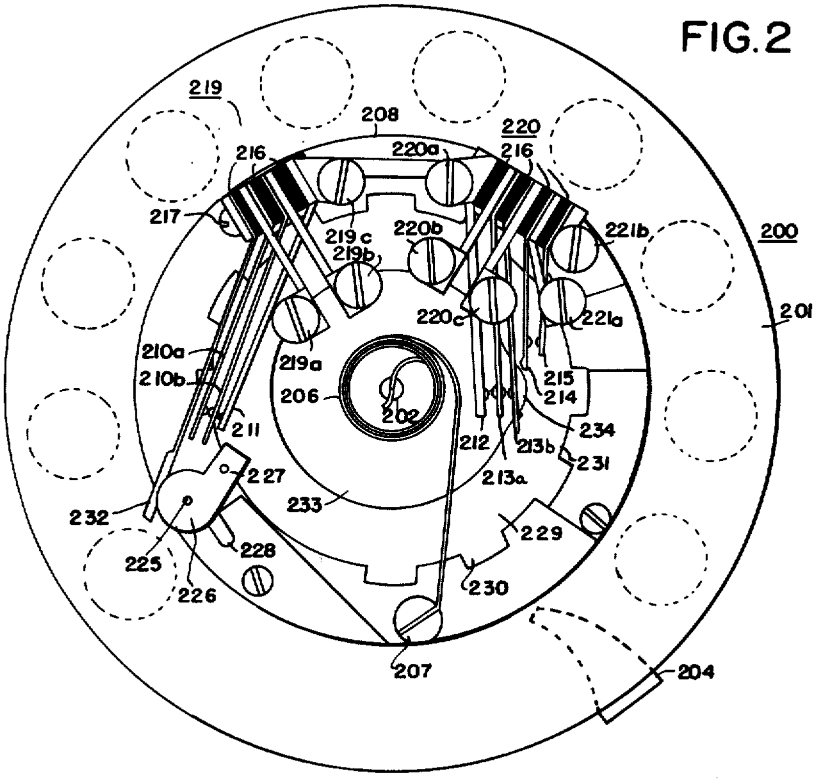
FIG.2
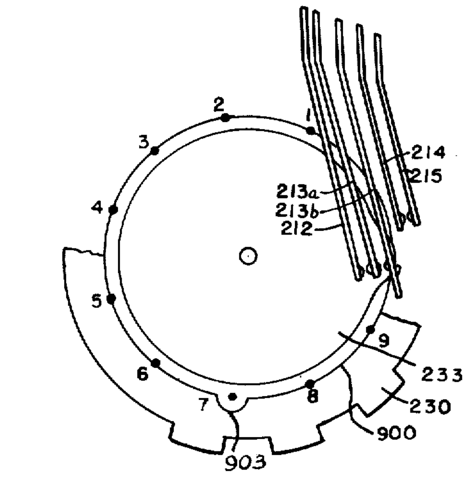
FIG.9
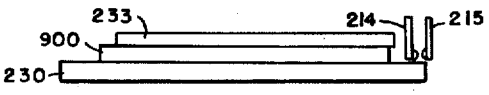
INVENTOR.
ARNE OXAAL
BY Brown, Jackson,
Boettcher & Dienner
ATTORNEYS Sept. 24, 1957 A. OXAAL 2,807,669

AUTOMATIC TELEPHONE SYSTEM

Filed May 12, 1950 9 Sheets-Sheet 3

INVENTOR.
ARNE OXAAL

BY Brown, Jackson, Boettcher & Dienner

ATTORNEYS

INVENTOR.
ARNE OXAAL
BY Brown, Jackson, Boettcher & Dienner
ATTORNEYS

INVENTOR.
ARNE OXAAL
BY Brown, Jackson, Boettcher & Dienner
ATTORNEYS

Sept. 24, 1957 A. OXAAL 2,807,669

AUTOMATIC TELEPHONE SYSTEM

Filed May 12, 1950 9 Sheets-Sheet 6

INVENTOR.
ARNE OXAAL

BY Brown, Jackson, Boettcher & Dienner

ATTORNEYS

INVENTOR.
ARNE OXAAL
BY Brown, Jackson, Boettcher & Dienner
ATTORNEYS

Sept. 24, 1957 A. OXAAL 2,807,669

AUTOMATIC TELEPHONE SYSTEM

Filed May 12, 1950 9 Sheets-Sheet 8

INVENTOR.
ARNE OXAAL
BY Brown, Jackson, Boettcher & Dienner
ATTORNEYS

Sept. 24, 1957 A. OXAAL 2,807,669

AUTOMATIC TELEPHONE SYSTEM

Filed May 12, 1950 9 Sheets-Sheet 9

INVENTOR.
ARNE OXAAL

BY Brown, Jackson,
Boettcher & Dienner

ATTORNEYS

United States Patent Office 2,807,669

Patented Sept. 24, 1957

2,807,669

AUTOMATIC TELEPHONE SYSTEM

Arne Oxaal, Kenton, Ohio, assignor to North Electric Company, a corporation of Ohio Application May 12, 1950, Serial No. 161,677

35 Claims. (Cl. 179—18)

The present invention relates, in general, to an automatic telephone exchange which is adapted to serve a plurality of subscribers, and more particularly to a community automatic telephone exchange of the all-relay type which is arranged to provide various types of special services for the exchange subscribers in a new and novel manner.

In automatic telephone systems the provision of improved, completely automatic service which is speedy, reliable and dependable is always a primary object of the operating telephone companies. In providing improved service of this desirable type, however, the operators are constantly burdened with the problem of maintaining costs and overhead at a minimum and practical level, and frequently, in the provision of special service equipment one or the other has to be sacrificed. There is, therefore, a definite existing need in the field for telephone equipment which is sufficiently flexible and simplex in structure to permit the ready provision of various types of special services for use therewith in an economical and practical manner, and it is with such improved type of equipment that this invention is concerned.

It is a well known expedient in the telephone art to reduce overhead costs, and correspondingly the subscriber rates, by the use of party line installations, it being apparent that in using each line to service a large number of parties a smaller number of costly lines for a given area is required. Another well known expedient for reducing costs and for increasing the speed of operation comprises the use of automatic equipment in the exchange, wherever possible, which is controlled by the calling subscriber to establish the desired connections, it being apparent that the services of a large number of operators are thereby eliminated to reduce operating expenses.

In a smaller community exchange, for example, such as used in suburban areas which are located geographically adjacent to a metropolitan area, a large amount of the traffic will consist of toll calls between the suburban and metropolitan exchanges. In accordance with conventional practice a call of this type is established with the aid of an operator, who records the call, along with other suitable identifying data, for subsequent billing purposes. Such operation in addition to increasing the cost of operation is extremely time-consuming in nature, and tends to tie up the exchange equipment for undesirably long periods of time. Accordingly, by providing automatic switching means which is accessible to the suburban subscribers for extending calls to the metropolitan exchange independently of an operator's position (and vice versa), the time for establishing a connection is considerably reduced, burdening of the equipment is minimized, and a material reduction in exchange overhead costs is accomplished.

In that some subscribers require frequent access to toll line trunks and other subscribers have infrequent need thereof, the amortization of the equipment to be provided in a given exchange raises problems as to equitable layout and equipment charges to the subscribers. One equitable and practical arrangement, which has proven satisfactory in the field heretofore, comprises the inclusion of both automatic equipment and operators positions in an exchange and the division of the subscribers into several classes; that is, a first class of subscribers who have frequent need of toll line equipment and who are willing to pay a flat fee for a given period for the privilege of having free access to a toll trunk at any time by merely dialling a given number; and a second class of subscribers who extend their toll calls in the conventional manner over an operator's position and are charged for each of the extended calls.

It is apparent from the foregoing that the dictates of economy and improved service teach the inclusion of both party line equipment and preferred special service equipment in automatic exchanges, and particularly in exchanges for use in suburban areas. Unfortunately, however, the inclusion of both of these individually desirable arrangements in a single exchange heretofore has proven impractical by reason of the enigmatic servicing problems and the burdensome and time-consuming installation difficulties encountered whenever such dual inclusion was attempted.

Such problems have been specifically caused by the inability of the equipment known heretofore in the art to provide simple, inexpensive, special-service apparatus which permits both classes of subscribers to be connected to a single party line; that is, the connection to a single party line of the subscribers who are granted unrestricted access to the toll trunk line and the subscribers who extend their calls over an operator's position in the conventional manner.

It is apparent that in an exchange which primarily serves rural and suburban areas, a single line may extend for several miles to service only ten or twelve subscribers, and, accordingly, in previous type installations the subscribers in such areas must be limited to one class of service or the other. Such condition does not, of course, go hand in hand with good merchandising and creates a service deficiency which might well be corrected.

An additional disadvantage which is common to the exchanges known heretofore, and especially to exchanges which extend into sparsely settled areas, is contained in the serious problems which arise in effecting satisfactory line assignments whenever a subscriber having one class of service requests a service of another type, it being apparent that a limited number of such changes may be satisfactorily accomplished in sparsely settled areas having a comparatively small number of lines.

It is to the provision of equipment, which permits the party line connection of various subscribers having different type of special service privileges, that this invention has been primarily directed. It is the main object of the invention to provide an improved, more flexible, all-relay type exchange in which party line connection of several classes of subscribers may be more readily effected in a more economical manner.

An ancillary object of the invention is to provide a basic control circuit which is under the supervision of the calling subscriber, and which is operative, in its use, to provide access to a particular predetermined special service for such subscriber.

In the presently illustrated embodiment, the particular special service made accessible to the subscriber by this control circuit is conventionally known as trunk screening. The manner in which the basic control circuit of the present invention may be used in selecting other special services is shown in the copending application which was filed on March 24, 1952, received Serial No. 278,242, entitled "Automatic Telephone Exchange," and which is assigned to the assignee of this invention.

Another object of the invention is the provision of a control circuit which is controlled by a conventional dial modified only by the addition of a pair of auxiliary spring sets whereby conversion of systems to this arrangement is accomplished in an economical manner.

A further object of the invention is to provide novel protective means which prevent unscrupulous parties from having access to the special services provided by fraudulent adjustment of the telephone line circuit.

Referring now to the drawings, other objects and features of the invention will be apparent from the following specification and claims, which, when considered in conjunction with the accompanying drawings comprising Figures 1 to 13 inclusive, show an embodiment of the invention as included in a community type all-relay telephone exchange of the type described.

The all-relay exchange 110 as shown therein is adapted to serve a suburban area A which is geographically adjacent a metropolitan area B which is served by a second exchange 111, inter-office trunks extending between these exchanges to provide communication between the subscribers thereof. In accordance with the invention, preferred subscribers of exchange A may gain access to these interoffice trunks by merely dialling a predetermined digit such as nine, while others of the subscribers are required to extend their calls over a toll operator's position 144.

Specifically, Figure 1 illustrates in block diagrammatic form the manner of arrangement of the equipment in both of the exchanges;

Figure 2 is a perspective view of a dial adapted for use with substations provided with said special service;

Figures 1, 8:
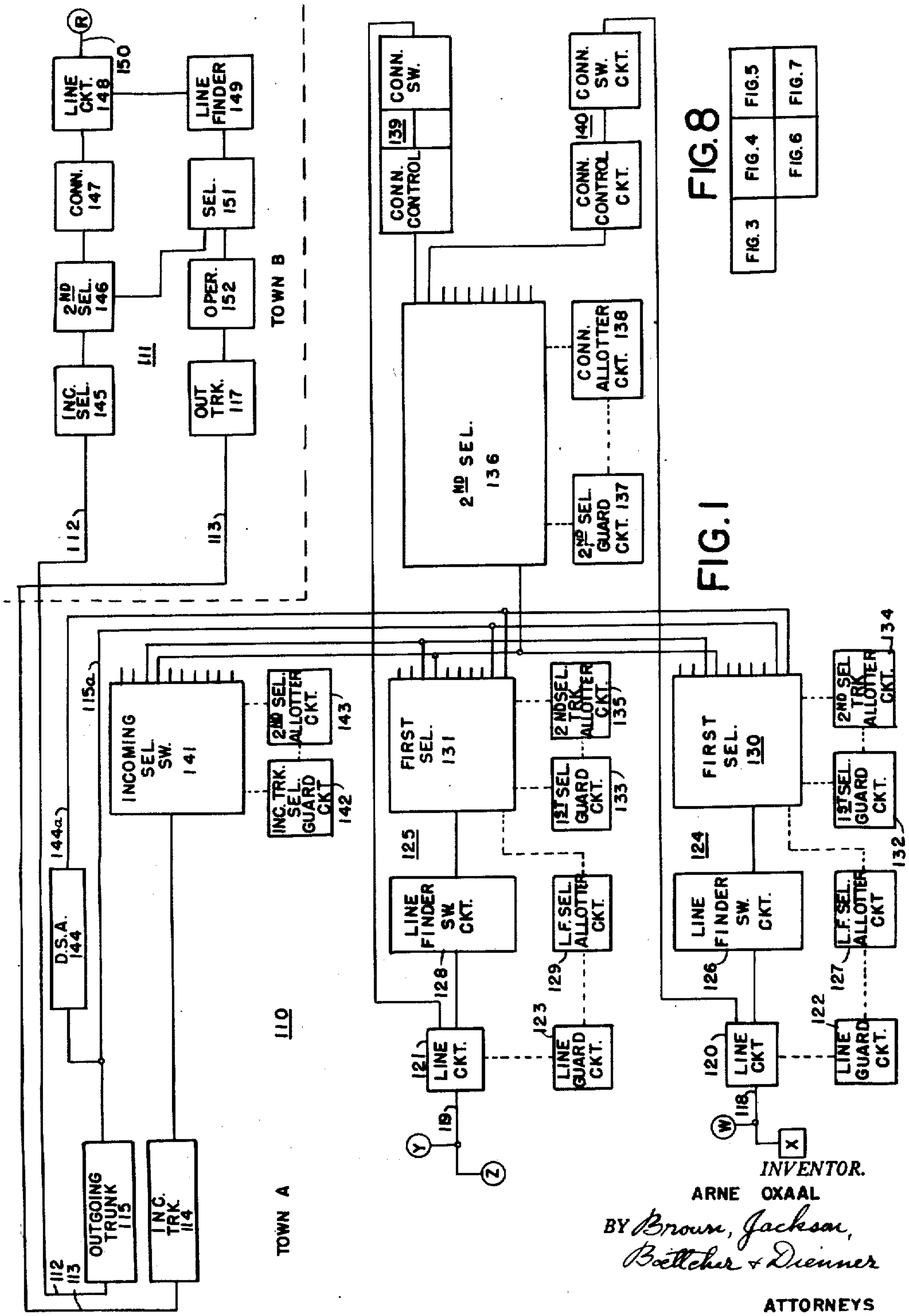

Figures 4 to 7 when arranged as indicated in Figure 8 illustrate a selector switch of the all-relay type which is arranged for use in exchanges adapted to provide the special service feature of the invention;

Figure 9 illustrates a mechanical cam member of the type used in a second modification of the invention; and Figures 10 to 13 inclusive are diagrammatic sketches of the manner in which the selector mechanism shown in Figures 4 to 7 inclusive may be modified to effect the provision of further novel embodiments of the invention.

It should be understood that the arrangement illustrated is merely one embodiment of the invention, and that numerous modifications and rearrangements thereof are possible without departing from the true spirit and scope of the invention.

GENERAL DESCRIPTION

Referring now more particularly to Figure 1 of the drawings, the telephone system there shown in schematic form comprises a first community exchange 110, including automatic switches of the all-relay type, and a second exchange 111 including automatic switching of the mechanical type. The exchanges 110 and 111 are illustrated as being disposed in adjacent towns A and B respectively and as being interconnected by a group of trunk lines such as shown at 112 and 113. A group of trunks, such as the one shown as 113, are terminated at town A by incoming trunk circuits, such as incoming trunk circuits 114, and at town B by outgoing trunk circuits such as the one shown at 117. A group of trunk lines, such as the one shown as 112, are terminated at town A by outgoing trunk circuits such as the one shown at 115, and at town B by incoming selectors, such as the one shown at 145.

Exchange 110 at town A is shown as having an operator's position 144 which is accessible to the subscribers of town A over the illustrated switching equipment.

A plurality of subscribers' lines, two of which are indicated as 118 and 119 (directory number 41126) extend to the exchange equipment. Subscriber lines 118 and 119 are illustrated as being of the multi-party type line, subscriber line 118 having two or more telephone substations such as W and X connected thereto and subscriber line 119 having substations such as Y and Z, connected thereto. It is to be understood that a larger number of subscribers may be connected to multi-party line installations in accordance with known telephone practice. Other types of subscribers' lines terminating at the community exchange may comprise the well known single party type or private lines. Selective ringing on party lines may be accomplished by the well known bridged ringing, and divided ringing with ground return.

As previously indicated, the subscribers in exchange 110 at town A are divided into several toll service classes that is, a first class, such as subscriber X, who may only gain access to the subscribers in exchange 111 by dialling the operator's position 144 and requesting extension of the call to the exchange 111 over a trunk line such as 112 extending thereto and a second or preferred class of subscribers such as subscriber W who is entitled to extend calls to the subscribers of town B, independent of the operator's position 144, by merely prefixing the directory number of the desired party in town B with a predetermined digit. It is noted that subscriber line 118 is comprised of both classes of subscribers X and W, whereas subscriber line 119 is comprised of subscribers Y and Z having the special service privileges.

Each of the lines such as 118 and 119 which extend to the exchange 110 terminates in an individual line circuit such as 120 and 121, through which access is gained to finder-selector links, such as those illustrated at 124 and 125. Thus, line 118 terminates in a line circuit 120 and associated line guard circuit 122 through which it is connected to a contact spring of a finder switch, such as 126, and the contact springs of a selector switch such as 130, which two switches are connected together by link lines to form a finder-selector link 124 which is served by the conventional line finder selector allotter circuit 127, first selector guard circuit 132 and second selector and trunk allotter circuit 134.

Similarly, the line 119 terminates at a line circuit 121 and line guard circuit 123 whereby access is gained to a finder-selector link, such as 125, which is served by the conventional type line finder-selector allotter circuit 129, first selector guard circuit 133, and second selector and trunk allotter circuit 135.

The number of links such as 124 and 125 which are required for satisfactory service will depend upon the number of subscribers' lines which are connected in the system, taking into account the character of the exchange and the normal volume of equivalent telephone traffic experienced in exchanges of equivalent size. In an installation adapted to serve 1,500 lines, for instance, from 150 to 200 links may be considered adequate to provide reliable and prompt service. For incoming trunk use from exchange 111, 40 incoming trunks with associated incoming selectors should prove adequate and for outgoing calls to exchange 111 approximately 40 trunks should provide satisfactory service.

The finder-selector links 124 and 125 may be connected over a number of levels to a series of second selector switches, such as indicated at 136, which are in turn connected to a series of connector switches, such as 139 and 140, for automatically completing local calls between the subscribers of exchange 110.

In the present arrangement one level of the finder-selector links 124 and 125 is assigned to provide access for subscribers having special service privileges to the outgoing trunk circuits, such as the one shown at 115. Another level is assigned to provide toll service for all subscribers over a conventional type operator's switchboard, such as is schematically shown at 144.

Subscribers, such as R in exchange 111, may gain access to subscriber lines in exchange 110 over one of the incoming trunks, such as shown at 113, one of a group of trunk repeaters, such as shown at 114, and one of a group of incoming selectors, such as shown at 141, a second selector such as 136, and a connector, such as 139 and 140. Exchange 111 at town B may comprise conventional type mechanical switching units, which may be connected to a group of incoming trunk circuits such as 112 and include a group of incoming trunk selectors, such as 145, a group of second selectors such as 146, a group of connector switches, such as 147, individual line circuits, such as shown at 148, and subscriber substations such as R. Subscriber R is shown as having access to local subscribers and operators positions over the line circuit 148, one of a group of line finders such as 149, and one of a group of selectors such as 151. The operator's position is shown connected to a group of outgoing trunk circuits, such as 117 from which trunk lines such as 113 extend to trunk circuits 114 in exchange 110 of town A.

*General operation—(a) local calls*

The operation of the system to extend a local call initiated at any one of the telephone substations in exchange 110 to another of the telephone substations in exchange 110 is described briefly below, the details of the circuit arrangement being omitted in view of their unimportance relative to the disclosure of the invention. In extending a call initiated at one of the telephone stations, as for example station W, to one of the telephone stations connected to a subscriber line in the same exchange, as for example station Y, a calling number comprising a thousands digit, a hundreds digit, a tens digit, a units digit and a code ringing digit are dialled in the order name by the subscriber at the calling station W. That is, the subscriber at telephone substation W on line 118, initiates a call by lifting his receiver from the switch hook in the conventional manner, and the line equipment at 120 activates the associated line guard circuit 122 which in turn activates the line-finder selector allotter circuit 127 which responsively operates a finder-selector link, such as 124, which has been previously assigned to the common line-finder selector allotter, such as 127, to seize the calling line 118.

Assuming that link equipment 124 is assigned by the link distributor 127 to set up the connection, the finder switch 126 of the link operates to select the calling line 118 and to connect it through to the conductors of the selector switch 130 of the link. When the calling line 118 is seized and extended by way of finder switch 126 to the associated selector switch 130, it is marked as busy in all of the connector switches, and the control equipment of the seized link is automatically conditioned to respond to the impulses of the first digit transmitted from a conventional impulsing device provided at the calling station W.

The operation of the exchange switching may be best illustrated by assigning a directory number to the called party Y and it will be therefore assumed that substation Y has a directory number of 4112–6. Upon extension of the call to the selector 130 of the operative link 124, dial tone is transmitted over the connection to the calling party to indicate to the subscriber that the directory number may now be dialled. As the subscriber of substation W dials the directory number 4112–6 the selector switch 130 responds to the impulses of the thousands digit 4 by selecting one of the fourth group of thousand lines to extend the call over an idle allocated one of a group of second selectors, such as 136. Assuming that the illustrated second selector 136 is idle and is selected by the selector 130 of the finder selector link 124, and that the thousands digit 1 is received over the connection, the second selector switch is thereupon responsively operated to select an idle one of the first group connector switches, such as 139.

Assuming the illustrated connector switch 139 is idle and is selected from this group by second selector 136, the connector switch 139 will respond to receipt of the tens digit 1 to select the first group of ten lines, which includes the called line 4112. Thereafter, and in response to the dialling of the units digit 2, the called line 119 (directory number 4112) is selected by the connector from the selected group of ten lines. When the called line has been thus selected, the control apparatus included in the connector circuit functions to test this line for the purpose of determining the busy or idle condition of such line. In the event that the called line is busy, busy tone current is applied over the connection which has been thus far completed to indicate to the party at the calling substation W that the desired connection with subscriber Y cannot be completed at this time.

Should the called line be idle at the time of selection, the code selecting or ringing digit, which in this case is digit 6, will cause a selected coded ringing current, which code is assigned to subscriber Y, to be applied to the side of the line to which the ringer of the telephone substation Y is connected. During the ringing operation, ring-back tone current is applied to the loop to indicate to the calling party at substation W that the substation Y is being signalled.

The connection between the calling and called telephone stations is completed on answering of the call at the called telephone station Y. The link circuit apparatus is such that the link utilized in setting up the desired connection is released only when the connection is cleared at the calling one of the telephone stations, which in this connection is substation W.

*Reverting calls*

The switching apparatus located in exchange 110 may also be utilized in setting up a connection between two telephone stations connected to the same subscriber line, as for example W and X, the sole purpose of operation of the apparatus in such application being to apply ringing current of the proper code to the mutual lines of the subscribers, whereby the party being called may respond to this particular signal. In setting up a connection of this nature, the call is initiated over the line equipment in the manner heretofore described.

Following the dialling of the digits of the directory number of subscriber X by subscriber W, the calling party W replaces his receiver upon its switch hook, whereupon, the switching units 124 and 136 are released, and ringing current of the selected code corresponding to the called telephone station X is applied to line 118 through switching unit 140 which is held. As the call is answered by the subscriber at substation X, the operated link such as 140 is released and the line circuit 120 is operated to make line 118 busy to the connectors to thereby prevent seizure of the line by a connector switch in the event of extension of another call to one of the telephone substations on line 118.

The line circuit 120 is released when the connection is released by both the calling and called telephone stations W and X respectively.

*(b) Interexchange calls*

As heretofore pointed out, the community exchange is also interconnected with a second exchange, such as 111, through a series of trunk lines such as the illustrated lines 112 and 113.

The outgoing trunk circuit 115 and associated trunk line 112 are shown as being accessible over the ninth level of the trunk selectors, such as 130 and 131, by the subscribers of the class entitled to special or preferred service privileges. Briefly, upon seizure of a trunk line, such as 112, responsive to the dialling of digit nine by a subscriber such as W, the connection to a desired party, such as R, in the distant exchange B may be completed by dialling the directory number assigned to substation R thereat.

The group of outgoing interoffice trunk lines, such as trunk line 112, are accessible to the parties not having restricted service through an operator's position, such as is shown at 144. The operator's position is accessible to all subscribers over the tenth level of the first selector, such level being selected upon the dialling of the digit 0 in the conventional manner. The operator will seize an outgoing trunk, such as 112, and then extend the call to a desired subscriber, such as R, by dialling the assigned directory number of that substation. The connection is released in the conventional manner by the operator upon receipt of the disconnect signal incident to restoration of the local equipment by the calling and called parties.

The subscribers in the second exchange 111 may set up connections with desired subscribers in the automatic exchange 110 over interconnecting office trunk lines, such as 113. The equipment in automatic exchange 111 may be such as to permit access to the trunk lines by the subscriber or such as to require the use of an operator's position to extend the call. In the latter event, the calling party will signal the operator in a well known manner, and the operator, in turn, will seize trunk circuit 117 and trunk line 113 over associated equipment. The call is then further extended over a seized one of a group of incoming selectors, such as 141, by the dialling of the assigned directory number of the desired subscriber in exchange 110.

Assuming that the calling subscriber in exchange 111 is calling subscriber Y in exchange 110 the operator will dial directory number 41126, responsive to the subscriber's request, and the seized incoming selector, such as 141, will respond to the thousands digit 4 to select one of the fourth group of second selector switches, such as 136; the hundreds digit 1 is effective to cause selector switch 136 to select one of the connectors, such as 139 of the first group of connectors, and connector 139 is operated responsive to the dialling of digits 1 and 2 to extend the call to subscriber line 119 (directory number 41126). With receipt of digit 6, the proper code ring is applied to the line and the call is completed with answering by the called subscriber Y. Release of the connection will normally be effected by the distant operator upon receipt of the disconnect signals incident upon hanging up of the calling and called parties.

In an exchange of the aforementioned size, forty selectors, such as 141, might well prove ample for use with the same number of terminal toll trunks, such figures being, of course, variable in accordance with the amount of traffic peculiar to the community in which the equipment is installed.

*Subscribers substations*

As previously pointed out, each of the subscribers in exchange 110 are assigned to one of several classes and provision is made in the exchange for imposing restrictions on the service rendered to the subscriber in accordance with the class to which he is assigned. Thus, a subscriber, such as X who does not have preferred service may gain access to a trunk line such as 112 only by extending the call via the tool operator at 144. The operator may thus maintain an accurate record of the calls established by the subscribers of this class and an accurate tool charge for the services performed may be periodically submitted to these subscribers.

A subscriber, such as W having the second class of service conventionally known as preferred service, may obtain access to an outgoing trunk, such as 112, merely by dialling the predetermined assigned digit nine. The call to the subscriber R is then completed by the dialling of his assigned directory number.

According to the invention, the special or preferred service for subscribers in the second class is accomplished by the provision of a novel type special service control circuit. The novel circuit is in turn arranged to be automatically controlled by a special impulsing device located at the substations of the preferred subscribers which in its simplest form comprises a conventional dial which is modified to include an extra set of specially disposed special service springs. In a second embodiment the preferred station also includes a special cam member for effecting predetermined timed operations of the control circuit.

More particularly, with reference to Figure 2, the calling device 200 there shpwn is of the conventional type which is modified by the addition of a set of special springs **210*b*, 214 and 215 to provide the preselected subscribers with the special service described. The calling device, as illustrated, basically comprises an outer casing 201, a rotatable arbor 202, a finger wheel or dial (not shown) secured to the outer end of the arbor, and a cooperating finger stop 204. The finger wheel has ten spaced apart openings therein which are adapted to receive the finger of the user, and which respectively correspond to the digits 1 to 0, inclusive. A coil spring 206 is disposed about and attached to the lower end of the arbor member 202, the upper end of the coil spring 206 being secured to a slotted projecting lug 207 which is disposed on the casing 201**.

A vertically disposed support member 208 attached to the main casing 201 is adapted to support a horizontally disposed set of impulse springs **210*a*, 210*b* and 211, a set of off normal springs 212, 213*a* and 213*b*, and a set of special service springs 214 and 215. The inner ends of the main impulse springs 210*a*, 210*b* and 211 are suitably insulated from each other and from the support member 208 by a plurality of vertically disposed strips of insulating material, such as 216, and are retained in clamped position by screw mounting member 217. Terminal members 219*a*, 219*b*, and 219*c*** are secured in cooperative relation with the impulse springs for electrically interconnecting the impulsing contacts with the line circuit equipment, their interconnection therewith being more clearly brought out by the schematic sketch of Figure 3.

The inner ends of the off normal springs **212, 213*a* and 213*b* and special service springs 214 and 215 are similarly insulated from each other and from the support member 208 by a plurality of strips of insulating material, such as 216, and are also retained in clamped position by a set of screw members, such as 217. Terminal members 220*a*, *b*, *c*, and 221*a* and *b*** inclusive, extend vertically from the individual spring members for interconnection with the line circuit equipment.

A pin member 225 projecting upwardly from the main body 201 of the dial supports an inwardly-extending, pivotally mounted pawl 226 having attached to its outer end a small downwardly depending pin 227 for effecting operation of the pawl of one of its three positions, that is, a normal position, a non-operative position and a contact closing position.

A break wheel 229 attached to the arbor member 202 rotates clockwise (looking at the front of the dial) with a winding operation of the dial wheel (not shown) and a plurality of teeth, such as 230, located on the outer peripheral edge of the break wheel are adapted to engage the pawl pin member 227 to urge the pawl 226 into engagement with a stop member 228 as the teeth pass thereby. Each successive identation, such as 231, following each tooth member 230 permits the pawl 226 to be restored to its normal position by the force exerted thereupon by the forward end of a U-shaped leaf spring 232.

An off-normal cam member 233 of insulating material is attached to the outward face of the break wheel 229 and in its normal position (shown in Figure 2) an eccentric portion 234 located on the outer edge thereof is adapted to maintain the off-normal springs **212, 213*a* and 213*b* in the open position, the resiliency of spring member 213*b* forcing the contacts into engagement as the dial is moved off normal. Special service springs 214 and 215 are mounted so as to be closed by the off-normal cam at a predetermined time in the operation of the dial and as shown herein are adapted to be closed as the dial is effecting the transmission of the open portion of the last impulse of the digit registered. Specifically, if digit nine is registered on the dial the special contacts 210*a*, *b* and 214 and 215** are closed as the open period of the ninth impulse is being transmitted. Finally, the calling device comprises conventional governing mechanism (not shown) which effects uniform speed of the dial on release following the winding operation.

*Dial operation*

Insertion of the finger into one of the dial holes which corresponds to the digit to be transmitted, and rotation of the finger wheel in a clockwise direction (as viewed from the front of the dial) until the finger engages with the finger stop 204, will prepare the dial for transmission of the desired digit. With winding of the dial, pawl member 226 will be repeatedly operated between its normal and non-operative positions, and normally open off-normal springs 212 and 213 will be closed for the off-normal period. Special service springs 214 and 215 are momentarily operated to the closed position by eccentric portion 234 of cam member 233 as it moves therepast. No particular operation, other than dial preparation, is accomplished during this dial winding.

The subscriber, upon reaching the finger stop 204 releases the finger wheel, and the coil spring 206, which has been compressively wound during the winding operation, tends to restore to cause the dial wheel to return to its normal position. As the dial mechanism including the arbor 202, the break wheel 229 and the cam member 233, return toward the normal rest position, the teeth 230 on the break wheel 229 and indentations effect repeated operation of the pawl member 226 between its normal and contact operating positions; that is, with each engagement of a tooth with the pawl pin 227, the pawl 226 is moved into engagement with the outward end of the impulse spring **210*b* to open the impulse contacts on springs 211 and 210*b* to transmit the break portion of an impulse in conventional circuit arrangements. At the same time circuit contacts on special service pulse defining springs 210*a* and 210*b* are closed for a purpose to be more clearly defined hereinafter. As an indentation following a tooth passes the pawl pin 227, the pawl 226 is urged to its normal position by leaf spring 232 to reclose the contacts on springs 210*b* and 211** and the make portion of an impulse is transmitted.

As the pawl member effects transmission of the break portion of the final impulse of the series, the eccentric on cam 233 momentarily engages and closes the special service preparing contacts on springs 214 and 215 to prepare the dial for transmission of a special control pulse over special pulse defining contacts **210*a*, 210*b*** and the interconnecting equipment.

It is apparent from the foregoing that with each operation of the dial member, the impulse springs transmit a predetermined number of switch operating impulses of the conventional make-break variety, and the special service contacts (in this embodiment) transmit a control pulse only during the open period of the last switch operating impulse to be so transmitted.

*Selector switch description*

Figure 3:
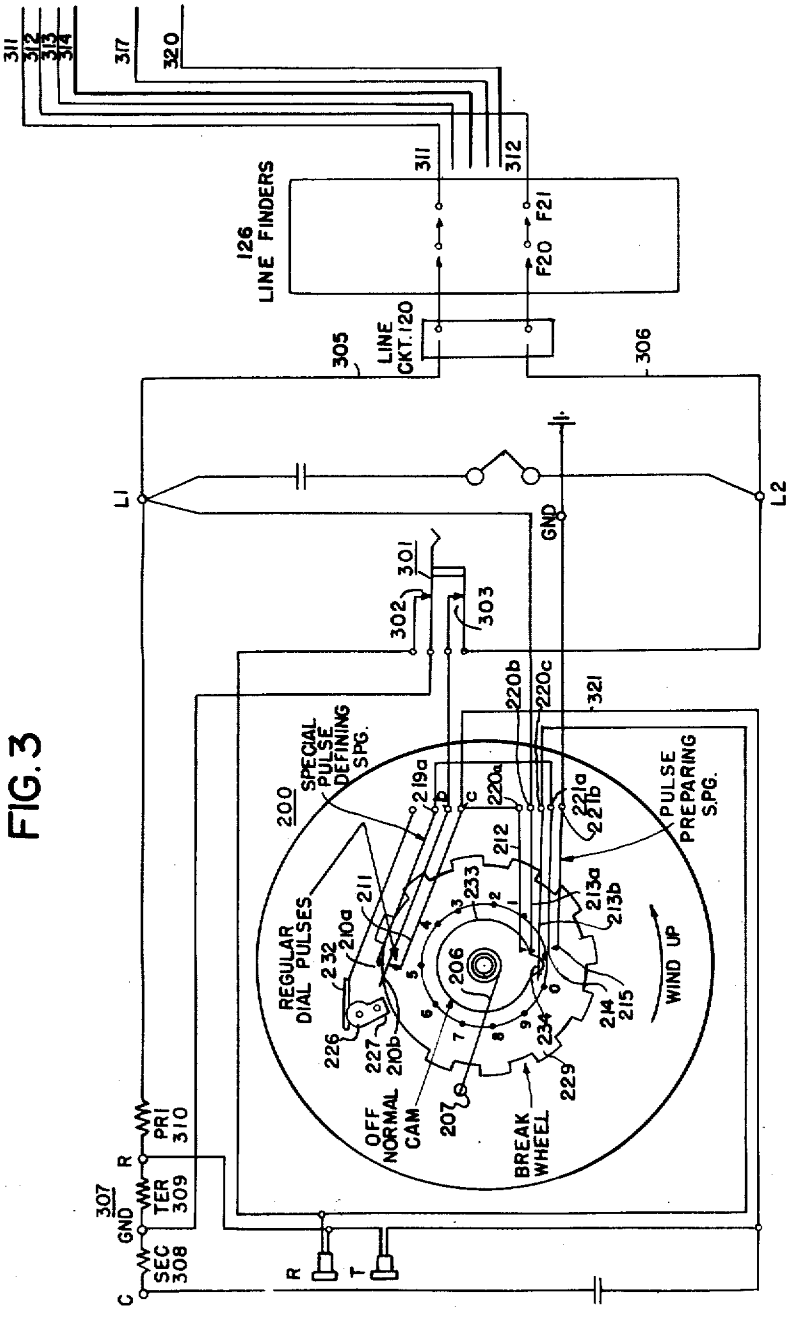
Figure 3 is a diagrammatic showing of the dial which is shown in perspective in Figure 2.

With reference to Figure 3, the schematic disclosure therein illustrates the manner in which the novel type dial, such as 200, is operative to provide special service privileges for a subscriber equipped with such device.

The schematic illustration is more readily understood when considered with the cooperating exchange apparatus and especially when considered with the novel selector equipment shown in Figures 4, 5, 6 and 7 which forms a basic portion of the invention.

The selector equipment 130, as there shown, cooperates with the dials of the individual subscribers to selectively provide special service connections to only those parties who are entitled to such service. For instance, in the illustrated arrangement the selector is adapted to respond to the transmission of a predetermined digit nine by a party equipped with a special service dial 200 to connect such party to an outgoing trunk 115, whereby further dialling of the assigned directory number of a party in the distant exchange 111 will establish a connection with the desired party thereat. The same selector is operative responsive to the dialling of the same predetermined digit 9 by a party such as X, who is not entitled to use of the special service, to apply busy tone to the line. Such discriminating operation is primarily accomplished by the provision of selector switches having a control arrangement which responsively effects the desired switching operation only with receipt of a timed special service impulse of the type transmitted by a dial such as 200.

As illustrated in Figures 4, 5, 6 and 7, the selector comprises a pair of series line relays 430 and 435 for controlling a connecting chain comprising relays 610 to 690 inclusive in accordance with the impulses received. A series of control relays 425 and 440 to 485 are operative to control the busy tone, time and switch holding circuits in conventional manner. Special service control relay 490 is operative to selectively control completion of the connection to associated outgoing trunks and protective relay 495 is arranged to prevent fraudulent use of the equipment.

Selector guard relays 700 to **700*m* (Fig. 7) are operative in conventional manner to prevent two or more selectors in the same group from seizing a further switch at the same moment. The guard and allotter relay arrangement 705, (Figure 7) is operative to cause idle ones of the associated selector trunk lines to be offered for selection, and a guard timing circuit 706 is operative to establish a definite time interval during which a connector or trunk must be selected, a busy condition being indicated to the subscriber should such time be exceeded. The selector group relays S1000 to S0000** are only partially shown, the operation thereof being readily understood with reference to the illustrated relays.

The manner of connection of the selector in an exchange, such as 110, becomes apparent with reference to Figures 1 and 3. As there shown, the incoming conductors of the selector are connected to an associated line finder, such as 126 or 128, of a finder-selector unit, such as 124 or 125, and the outgoing conductors extend either to associated second selector groups, such as 136, or outgoing trunks, such as 115.

OPERATION OF SELECTOR

(*a*) *Establishing a local call*

Referring now, more particularly, to the operation of the apparatus in the setting up of a connection between two local substations of exchange 110, such as subscribers W and Y, it is apparent that local calls will be established in a similar manner by both types of subscribers and consideration of a call as established by subscriber W, who is equipped with the dial equipment illustrated in Figure 3, will be illustrative of the operation of both types of dials.

A call is initiated in the conventional manner when the receiver at the calling substation W is removed from its associated hook, such as indicated at 301, an energizing circuit being completed to the line circuit 120 which is associated with a line finder, such as 126, such circuit extending over a loop circuit extending from the line circuit 120 over conductor 305, the primary winding 310 of induction coil 307, the transmitter unit T, the normally closed pulsing contacts on springs **210*b* and 211, hook switch contacts 303, and conductor 306 to line circuit 120**.

The line equipment 120, and line finder 126, operate in conventional manner to locate an idle link and extend the connection from the calling line over conductors 311 to 320 inclusive to the line relay in the associated selector switch 130 of the link 124. Conventional equipment in the line finder switch arrangement serves to busy the calling line to the other automatic switches having access thereto responsive to the operation of selector relay 445. Timing means (not shown) associated with the first selector provide a given predetermined time interval following seizure of the link for permitting the party to initiate the dialling operation for extending the call to further exchange equipment.

*(a) Selector seizure*

On seizure of the selector by its associated line finder 126 in the described manner, a combined circuit is completed for effecting energization of the selector line relays 430 and 435.

Series line relays 430 and 435 operate, and relay 435, at its contacts 436, closes a circuit to hold relay 440, and at its contacts 437 and 438 prepares a circuit for the sequence control relays of the selector. Hold relay 440 operates and at its contacts 442 completes an energizing circuit for slave relay 445 which extends from ground over contacts 442, the winding of slave relay 445 to battery, and at its contacts 441 prepares a circuit to the selector guard relays which is ineffective at this time.

Slave relay 445 operates, and at its contacts 446 connects ground to the test conductor 313 of the link holding and supervisory circuit. Slave relay 445 at its contacts 447 connects ground to conductor 317 which also forms a part of the link holding and supervisory circuit and at its contacts 448 prepares a point in the selector holding circuit.

The second line relay 430 also operates over the described loop and at its contacts 431 connects dial tone from lead ODT to the negative side of the subscriber's line, the circuit extending from dial tone source DT over contacts 431, contacts 461, contacts 476, a 5000 ohm resistor, and contacts 427 to the negative conductor 312 extending to the line finder and subscriber station.

The selector 130 of the finder selector link 124 is now conditioned for receipt of impulses from the dial 200 of the calling station W, the subscriber being informed of this fact in the conventional manner by the dial tone which is being transmitted over the connection.

*(b) Dialling operation*

The subscriber, accordingly, dials the first digit of the called party's directory number, which in the given illustration is digit 4. The dialling mechanism operates to alternately interrupt and complete the pulsing loop to thereby effect repeated energization and deenergization of the series line relays 430 and 435.

Specifically, with the first interruption of the loop circuit, line relays 430 and 435 are released. Line relay 430, in restoring, is effective at its contacts 432 to interrupt a point in the circuit to a special service guard relay 495. Line relay 435 simultaneously restores, and at its contacts 436 interrupts the operating circuit for hold relay 440, which being slow to release, remains operated for the duration of the break period. Relay 435 at its contacts 437 opens a point in the control circuit for the selector counting chain and at its contacts 437*a* prepares a point in the circuit to special service guard relay 495 which is presently interrupted by the open contacts 432 of relay 430. Relay 435 at its contacts 439 completes an operating circuit to transfer relay 453 which extends from battery over contacts 451, the winding of transfer relay 453, contacts 439, contacts 448 and contacts 429 of relay 425 to selector control ground.

Transfer relay 453 operates, and at its contacts 454 completes an operating circuit from battery to ground for an auxiliary or slave transfer relay 455. Relay 453 is slugged so as to be of the conventional slow-to-release type, and will accordingly remain operated for the period that the incoming set of impulses representing the first digit are received by the selector. Slave relay 455 operates, and at its contacts 456 connects a 150 ohm non-inductive resistance in parallel with line relay 430 to provide a dialling circuit of a lower overall resistance value, and at its contacts 457 and 458 opens points in the selection circuits for the group selection relays.

*(c) Counting chain operation*

Relay 435 at its contacts 439 also completes a circuit to counting chain relay 610, which is the first relay of the chain, the circuit extending from battery over contacts 451, conductor 404, the winding of relay 610, contacts 673, 683, and 693, conductor 409, contacts 487, 473, 439, 448 and 429 to selector control ground.

Counting chain relay 610 operates and at its contacts 611 prepares a self-holding circuit to the selector control holding ground which circuit extends from battery, over contacts 451, conductor 404, the winding of relay 610, contacts 611, 685, conductor 410 and contacts 448 and 429 to selector control ground.

Counting chain relay 610 at its contacts 612 prepares a point in the operating circuit for the first sequence relay 670, at its contacts 613 prepares a point in the operating circuit for relay 460, at its contacts 614 prepares a point to the special guard relay 495, and at its contacts 615 prepares a point in the operating circuit for relay 620 of the counting chain relays.

In brief summary, with receipt of the first break period of the first impulse, line relays 430 and 435 have restored to complete a low resistance dialling circuit, to operate the first of the selector counting chain relays, and to prepare circuits to the several control relays in the event that no further pulses are received. Relays 440, 445, 453, and 455 are maintained operated for a predetermined time by reason of their slow-to-release characteristics.

On receipt of the make period following the first break period selector line relays 430 and 435 are again energized over the aforedescribed loop circuit. Relay 435 at its contacts 436 recompletes the energizing circuit for the hold relay 440, at its contacts 437*a* is ineffective at this time, and at its contacts 439 interrupts the operating circuit for counting chain relay 610 which is now maintained energized over the aforedescribed self-holding circuit.

Relay 435 at its make contacts 438 completes an energizing circuit for sequence control relay 670, the circuit extending from battery through contacts 451, conductor 404, the winding of relay 670, contacts 687, 612, C402, and contacts 438, 448 and 429 to selector control ground. It is noted that the make contacts 437 and 438 of line relay 435 are alternately effective in their control operations, that is, make contacts 438 are effective with receipt of the first, third and further alternate impulses to control the sequence relays 670, 690 over conductor 402 and the contacts of the counting chain relays 610, 630, etc. Make contacts 437 are alternatively effective with receipt of the second, fourth, etc. impulses to control the sequence relays over conductor 401 and the contacts of counting chain relays 620, 635, etc.

Sequence relay 670 is now operated with closure of line relay contacts 438, and at its contacts 672 prepares a point in the counting chain selection circuits at its break contacts 673 interrupts a further point in the initial operating circuit for counting chain relay 610, and at its make contacts 674 prepares an operating circuit for the second counting chain relay 620. Sequence relay 670 at its contacts 676 also completes a self holding circuit which extends from battery over contacts 451, C404, the winding of relay 670, contacts 687, 676, C410, contacts 448 and contacts 429 to selector control ground. Finally, sequence relay 670 at its contacts 677 opens a point in the operating circuit for sequence relay 690.

Briefly then, responsive to the make period following the break period of the first impulse transmitted by the calling party, line relays 430 and 435, relays 440 and 445, counting chain relay 610, and the first sequence relay 670 are in the energized condition.

As the break period of the second impulse transmitted by the calling party is received, line relays 430 and 435 will be operated as heretofore described. The counting chain operation however will differ somewhat from that described as a result of the previous circuit preparations. Line relay 435, in releasing, now connects the pulsing ground of the selector to the second counting chain relay 620 over a circuit extending from counting chain battery on conductor 404, the winding of relay 620, contacts 615, 674, 683, 693, C409, and contacts 487, 473, 439, 448 and 429 to selector control ground.

Counting chain relay 620 operates, and at its contacts 621 completes a self holding circuit which extends from counting chain battery on conductor 404 over the winding of relay 620, contacts 621, 695, C410 and contacts 448, and 429 to selector control ground. Relay 620 at its contacts 622 prepares an operating circuit for relay 680 of the sequence relays, at its contacts 623 prepares a circuit to its associated second selector group relay (not shown), at its contacts 624 prepares a point in the circuit to special service guard relay 495, and at its contacts 625 prepares a point in an operating circuit for the third counting chain 630. Thus, following receipt of the break period of the second impulse control relays 440, 445, 453, 455, and counting chain relays 610 and 620, and relay 670 of the sequence relays are in the operated condition.

Responsive to receipt of the make period of the second impulse, line relays 430 and 435 are re-operated, as heretofore described, and relay 435 at its contacts 437 completes an operating circuit for the second sequence relay 680, which extends from counting chain battery on conductor 404 over the winding of relay 680, contacts 697, 622, C401, and contacts 437, 448, and 429 to link control ground.

Relay 680 operates and at its contacts 687 opens the holding circuit for the first sequence control relay 670, at its contacts 686 completes a self holding circuit which extends from counting chain battery on conductor 404 over the winding of sequence relay 680, contacts 697, 686, C410, and contacts 448 and 429 to link control ground. Sequence relay 680 at its contacts 684 prepares a point in an operating circuit for the third counting chain relay 630 and at its contacts 682 prepares a point in the counting chain selection circuits. At contacts 685, relay 680 releases first counting chain relay 610.

The first sequence control relay 670 releases and at its contacts 672 interrupts a point in the counting chain selection circuits, a parallel circuit being completed over contacts 682 at the time, at its contacts 674 opens a further point in the operating circuit for the second counting chain relay 620, at its break contacts 675 prepares a point in the holding circuit for counting chain relay 630, at its make contacts 676 opens a further point in its self holding circuit, and at its contacts 677, prepares a point in the operating circuit for the third sequence relay 690.

Briefly then, following receipt of the make period of the second transmitted impulse, an energizing circuit for the third counting chain relay 630 is prepared and control relays 430, 435, 440, 445, 453, 455, the second counting chain relay 620 and the second sequence relay 680 are in the operated condition.

Responsive to receipt of the break period of the third incoming impulse, line relays 430 and 435 release in the manner heretofore described, and relay 435 at its contacts 437 opens a point in the operating circuit for the operated sequence relay 680, which is now held energized over the self holding circuit to link control ground heretofore described. Line relay 435 at its break contacts 439 completes an operating circuit to the third counting chain relay 630 which extends from counting chain battery on conductor 404 over the winding of relay 630, contacts 625, 684, 693, C409, and contacts 487, 473, 439, 448 and 429 to link control ground.

Counting chain relay 630 operates and at its contacts 631 completes a self holding circuit which extends from counting chain battery over the winding of relay 630, contacts 631, 675, C410, and contacts 448 and 429 to link control ground. Counting chain relay 630, at its contacts 632 prepares a point in the operating circuit for relay 690, at its contacts 633 prepares a point in the circuit to the selector group relay S3000 (not shown) which controls a second selector in the group assigned to the 3000's group. Relay 630 at its contacts **633*a* prepares a point in the circuit to the special service guard relay 495 and at its contacts 634 prepares a point in the operating circuit for the fourth counting chain relay 635. Thus following the receipt of the break period of the third impulse the second and third counting chain relays 620 and 630 and sequence relay 680** will be in the operated position.

With the subsequent re-operation of line relays 430 and 435 responsive to receipt of the third make period transmitted, line relay 435 at its contacts 438 completes an operating circuit for the third sequence relay, such circuit extending from counting chain battery on conductor 404 over the winding of sequence relay 690, contacts 677, 632, C402, and contacts 438, 448, and 429 of relay 425 to link control ground. Sequence relay 690 operates, and at its contacts 692 prepares a parallel circuit to the counting chain selection circuits, at its contacts 694 prepares a point in the operating circuit for the fourth counting chain relay 635, at its contacts 695 opens the holding circuit for the second counting chain relay 620; and at its contacts 696 completes a self holding circuit which extends from counting chain battery on conductor 404 over the winding of sequence relay 690, contacts 677, 696, C410, and contacts 448 and 429 to link control ground.

Counting chain relay 620 releases and at its contacts 625 opens the operating circuit for the third counting chain relay 630, which is held operated over the described holding circuit, at its contacts 621 opens a further point in its self holding circuit, at its contacts 622 opens a point in the energizing circuit for the second sequence relay 680; at its contacts 623 opens a further point in the circuit to the selector group relay S2000; and at its contacts 624 opens a further point in the circuit to the special service guard relay 495. Thus following receipt of the make period of the third impulse relays 430, 435, 440, 445, 453, 455, and counting chain relays 630 and sequence relay 680 are operated and an operating circuit for the fourth counting chain relay 635 is prepared.

Responsive to receipt of the open period of the fourth impulse transmitted by the subscriber, line relays 430 and 435 will release, and line relay 435 at its contacts 438 opens the energizing circuit to the third sequence relay 690 which is maintained operated over its self holding circuit heretofore described, and at its contacts 439 completes an energizing circuit to the fourth counting chain relay 635. Such circuit extends from counting chain battery on conductor 404 over the winding of counting chain relay 635, contacts 634, 694, C409, and contacts 487, 473, 439, 448 and 429 to link control ground.

Counting chain relay 635 operates, and at its contacts 637 prepares an operating circuit for first sequence relay 670, at its contacts 638 prepares a circuit to the selector group relay S4000 of a predetermined group of second selectors, at its contacts **638*a* prepares a circuit to the special service guard relay 495, at its contacts 639 prepares a circuit for the fifth counting chain relay 640**.

Thus on the break period of the fourth impulse received over the line from the subscriber substation, the third and fourth counting chain relays 630 and 635 and sequence relay 690 are operated, and circuits are prepared for the fifth counting chain relay 640 and the first sequence relay 670.

With receipt of the make period following the fourth break period line relays 430 and 435 operate, and relay 435 at its contacts 437 completes a circuit for the first sequence relay 670, which circuit extends from counting chain battery or conductor 404 over the winding of sequence relay 670, contacts 687, 637, C401 and contacts 437, 448 and 429 to link control ground. Line relay 435 at its contacts 439 opens the original energizing circuit for the fourth counting chain relay 635. Relay 635 is now held operated over its self holding circuit heretofore described. The first sequence relay 670 operates; and at its contacts 672 prepares a circuit for the counting chain selection circuits; at its contacts 674 prepares a point in the operating circuit for the fifth counting chain relay 640; at its contacts 675 opens the holding circuit for the third counting chain relay 630; at its contacts 676 completes a self holding circuit which extends from counting chain battery on conductor 404 over the winding of sequence relay 670, contacts 687, 676, C410 and contacts 448 and 429 to link control ground. Relay 670 at its contacts 677 opens the holding circuit for relay 690. The third counting chain relay 630 and the third sequence relay 690 now release. Thus, on completion of the receipt of the make period following the fourth break, the fourth counting chain relay 635 and the first sequence relay 670 are operated.

Assuming the digit dialled is four, line relays 430 and 435 are now held operated over the loop extending to the subscriber substation, and relays 440 and 445 are accordingly held operated by contact 436 of the operated line relay 435. Transfer relay 453, which has been maintained operated for the duration of the four impulses, is now restored by interruption of the energizing circuit at the opened contacts 439 of line relay 435 for a period which exceeds the release time delay of transfer relay 453. In restoring, transfer relay at its contacts 454 opens the energizing circuit for slave transfer relay 455 which restores, and at its contacts 456 disconnects the 150 ohm resistance from the dialling circuit. The transfer relay at its contacts 458 is ineffective at this time, and at its contacts 457 connects selector link ground to the selector group relay S4000, for extending the connection to a second selector of the four thousand group. The operating circuit for relay S4000 extends from battery over the winding of relay 4000, C605, contacts 638, C405, contacts 457, 483, C407, contacts 672, 681, and 691, C410, and contacts 448 and 429 to link control ground.

Selector group relay S4000 operates and at its contacts 535*c* locks to ground, and at its contacts 501*c* to 534*c* extends the positive, negative and test conductor leads from the units relays SI—SO of the first selector to the associated leads of the second selectors of group 4000; and at its contacts 533*c* and 536*c* prepares circuits for operating conventional type metering equipment which is well known in the art. Selector group relay S4000 at its contacts 501*c* completes an operating circuit for relay 485 which is adapted to control the associated one of the guard circuit relays 700*m* to prevent simultaneous selector seizure of the second selector group, the circuit extending from battery over the winding of relays 485, C418, contacts 501*c*, C420 and contacts 472, 448 and 429 to link control ground. The guard circuit control relay 485 operates, and at its contacts 487 opens a point in the selector pulsing circuit to the counting chain to prevent operation thereof during extension of the call to the second selector group, and connects the selector pulsing circuit instead to relay 475, which is operative to signal the subscriber in the event that a digit is prematurely dialled prior to seizure of a second selector.

The guard control relay 485 at its contacts 488 completes a circuit for associated guard relay 700 in the selector guard arrangement, the relay 700 being in a guard circuit so as to be individual to the first selector 130.

*(d) Selector guard relay operation*

Figure 7:
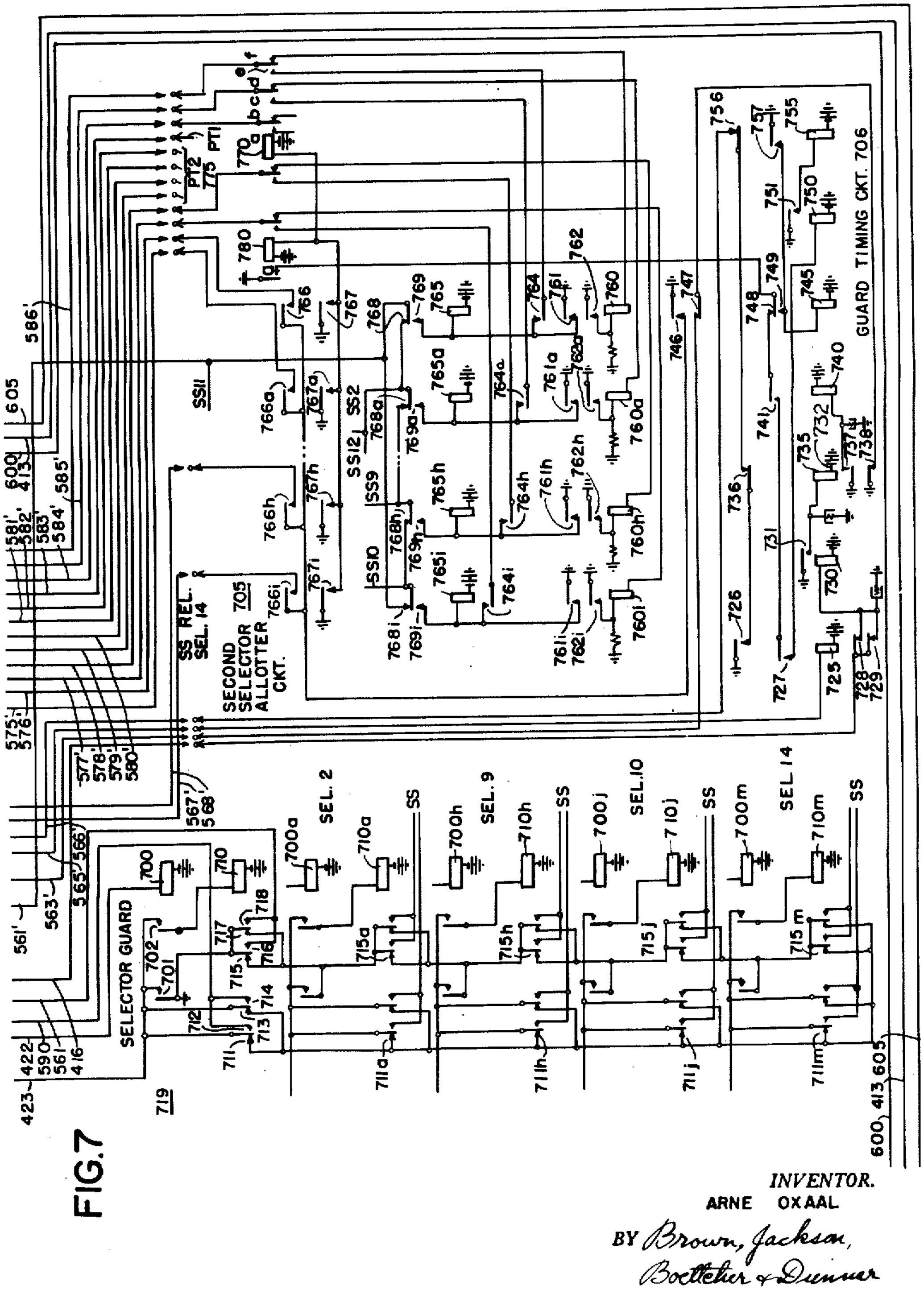

In more detail, the selector guard equipment as illustrated in Figure 7, comprises a group of selector relays, each of which is individual to a first selector, much in the manner that guard relay 700 is individual to the illustrated selector 130. Thus, if there are fourteen first selectors over which the given parties have access to the second selectors, there will be fourteen selector guard relays in the guard circuit. It is obviously essential that two or more first selectors, such as selector 130, be prevented from simultaneously attempting to seize one of the second selectors, and it is the purpose of the individual relays 700 and 710 in the circuit arrangement illustrated to prevent such operation.

The operating path of each guard relay 700, 700*a*, etc. passes over control contacts of a group of associated relays 710, 710*a* etc., the associated relays being operated responsive to operation of their associated guard relays 700, 700*a*, etc. Thus, in the event that one of the associated relays 710, 710*a*, etc. is operated, the operating circuit for the remaining guard relays 700, 700*a*, etc. will be opened, and the tendering of a call by a further selector will be thwarted by the guard circuit.

For example, assuming selector 130 is forwarding a connection and that no other selector in the group is in the process of seizing a second selector, the associated relays 710, 710*a*, etc. will be in the non-operated position and an operating circuit will extend to guard relay 700 individual to selector 130, the circuit for energizing guard relay 700 extending from battery over the winding of relay 700, C422, contacts 488, C423, contacts 711, contacts 715*m* . . . *a*, contacts 715 to selector guard ground. Relay 700 operates, and at its contacts 701 locks independent of the other guard relays and at 702 completes an operating circuit to its associated relay 710 which extends from battery over the winding of relay 710, contacts 702 and 701 to ground. Relay 710 operates, and at its contacts 715 opens the operating circuit for the remaining guard relays 700*a* to 700*m* associated with first selectors 2 to 14 in the group to prevent operation thereof pending selection of a second selector by selector 130. Relay 710 at its contacts 712 completes an operating circuit for allotter circuit control relay 560 which controls connection of the test leads of the desired second selectors to the second selector or trunk allotter circuit. The circuit for allotter circuit control relay 560 extends from battery over the winding of relay 560, C590 and contacts 712 and 701 to selector guard ground.

*(e) Second selector and trunk allotter equipment*

Relay 560 operates, and at its contacts 560*g* to 560*p*, inclusive, extends the operating circuit of the selector unit's relays 540 to 540*i* to the allotter circuit, at its contacts 560*o* to 560*z*, inclusive, completes a circuit from the test conductors P of the second selectors of the 4000 group to the testing relays 760 to 760*i*, inclusive, and at its contacts 560*c* prepares a circuit to operate the conventional exchange metering equipment.

As the trunk guard control relay 560 operates, the test conductor of each of the second selectors of the group which is seized (in this instance, the 4000 group), will be connected to the test relays 760 to 760*i*, inclusive.

A second selector in the idle condition connects low resistance battery to its test conductor, and a busy second selector connects ground to its test conductor.

*Second selector allotter circuit operation*

I. BUSY CONDITION

In the event that each of the second selectors of the group are in use, the guard timing circuit 706 is operative to so inform the subscriber. With reference to the initial seizure of the selector 130, it will be remembered that hold relay 440 is immediately operated and is maintained in such condition until the connection is switched through to further apparatus. Hold relay 440 at its contacts 441 completes an energizing circuit for the guard timing circuit relay 730, which extends from battery over the winding of relay 730, contacts 728, C416 and contacts 441 to ground. Timing circuit relay 730 operates and at its contacts 731 connects ground to timing circuit relay 735, which is made especially slow operating by condenser 732. Relay 735 operates, and at its contacts 736 opens a further point on the operating circuit for signal relay 475; at its contacts 737 completes an operating circuit to timing relay 740; and at its contacts 738 opens a circuit to the conventional overflow metering equipment.

Timing relay 740 operates, and at its contacts 741 prepares a circuit for the remaining relays in the timing arrangement for operation at a later period. Timing relays 730, 735 and 740 are held operated pending operation of the allotter circuit control relay, such as 560.

As relay 560 operates, an energizing circuit for timing cicuit relay 725 is completed from battery over the winding of timing relay 725, C565', contacts 560e, C563, C420 and contacts 472, 448 and 429 to selector control ground. Timing circuit relay 725 operates, and at its contacts 726 prepares a point in the operating circuit for signal relay 475 (presently opened at contacts 736); at its contacts 727 closes a point in the operating circuit for timing circuit relay 750; and at its contacts 728 and 729 opens a point in the operating circuit for timing circuit relay 730. Timing circuit relay 730 releases slowly and at its contacts 731 opens the operating circuit to timing circuit relay 735.

Relay 735 releases after a brief time interval and at its contacts 736 completes a point in the operating circuit for signal relay 475; at its contacts 737 interrupts the operating circuit for timer circuit relay 740; and at its contacts 738 completes a point in the energizing circuit to the overload meter. Relay 740, being of the slow-to-release type, remains operated for a brief interval and then releases; and at its contacts 741 interrupts the operating circuit to timing circuit relay 750. If an idle selector is not found, switching relays 770, 775 and 780 will not be operated, and timing relays 745, 750 and 755 will also be inoperative. Thus, with retoration of timing relay 735, an operating circuit is completed to signal relay 475, which extends from battery over relay 475, C419, C566, 560f, C566', contacts 756, 736 and 726 to trunk guard circuit ground.

Signal relay 475 operates and locks to ground over contacts 478 and 447. At its contacts 477, relay 475 disconnects the dial tone conductor and connects the busy tone conductor to the line over a 5000 ohm resistance, and at its contacts 479 completes an operating circuit to an associated signal relay 470. Relay 470 operates and at its contacts 471 connects ground to the busy tone circuit equipment via terminal OBS to energize same, whereby busy tone is placed on the busy tone conductor via terminal OBT and the negative conductor of the subscriber's line to indicate to the subscriber that the second selectors are busy. Relay 470 at its contacts 472 interrupts the operating circuit to the circuit relay 725 and the selector guard circuit relay 485; and at its contacts 473 opens the pulsing circuit to the relays of the counting chain.

Relay 485 releases, and at its contacts 487 recloses a point in the counting chain pulsing circuit; and at its contacts 488 opens the energizing circuits for the operated selector guard relay 700. Relay 700 releases, and at its contacts 701 opens the operating circuit for relay 710 and trunk control relay 560. Line relays 430, 435 and control relays 440 and 445 are maintained energized until such time as the calling party restores his receiver to release the finder selector link 124, in the well known manner; or, in the event that timing control relays of the conventional type are employed, the relays will be maintained energized until a given time period has expired, whereupon holding ground for the link equipment will be removed on expiration of a given time interim, independent of the subscriber operation.

II. SEIZURE OF AN IDLE SECOND SELECTOR

If each of the second selectors is idle as selector 130 extends the test leads thereto, low resistance battery will be connected to test relays 760 to 760i, inclusive. The connecting circuit for the first test relay 760 associated with the first selector 136 of the second selector group extends, for example, from low resistance battery in the second selector 136 over the test wire P(593), contacts 505c, C586, contacts 560z, C586', contacts 770f, the winding of the first test relay 760 over a 1200 ohm resistance to ground. Each of the other test relays 760a to 760i will be operated over similar paths in the event that its associated selector is in the idle condition. Those of the test relays which operate are effective at their contacts 762 to 762i to complete a circuit to ground to thus short circuit the associated 1200 ohm resistance and apply a more positive potential to the associated test conductor. The operated ones of the test relays 760 to 760i, at their contacts 761 to 761i, operate auxiliary associated relays 765 to 765i over obvious circuits.

Thus, the relays 765 to 765i associated with the operated ones of the relays 760 to 760i will now be energized. The operated ones of the associated relays 765 to 765i at their contacts 766 to 766i prepare energizing circuits for individual selector units relay 540 to 540i; as for example, relay 765 at its contacts 766 prepares a circuit for selector unit's relay 540.

The operated ones of the relays 765 to 765i, inclusive, at their contacts 767 to 767i complete an operating circuit for relays 770, 775 and 780 which are adapted to interrupt the test conduction and test relay connections; and at their contacts 764 to 764i prepare to ground the test leads of the associated second selector switches.

If any of the second selectors are idle, relays 770, 775 and 780 will now be operated to connect ground to the test wires from the second selector allotter circuit. For example, switching relays 770, being associated with the second selector 136, will operate to connect ground to the test wire 593 of the first selector, such circuit extending from ground over contacts 761, 764, 770e, C586', contacts 560z, conductor 586 and contacts 505c of selector group relay S4000 to the test lead P(593) of the second selector 136.

Switching relays 770, 775 and 780 operate and at their contacts, such as 770b, *d* and *f*, open the energizing circuits for the test relays 760 to 760i. Relays 760 to 760i all restore, in turn releasing all relays 765 to 765i with the exception of one relay in the group 765 to 765i which is held operated by the operated one of the selector guard relays 710 to 710m.

In the present illustration, relay 710 in the selector guard circuit associated with the operated selector 130 is in the operated condition, and a holding circuit for relay 765 is thus completed from battery over the winding of relay 765, contacts 769, C561', contacts 560a, C561, contacts 718 to selector guard circuit ground. The remaining relays 765a to 765i release. After relay 760 releases, ground is maintained through contacts 769 and 764 on the test wire.

It is apparent that if the first of the second selectors were busy, test relays 760 and 765 would have been inoperative, and assuming the next selector is not busy, test relay 765a would now be held in the operated condition by the ground forwarded by relay 710 via lead 561. Thus the test relay "closest to ground" associated with an idle second selector is held operated.

It will be remembered that timing relay 725 in operating responsive to operation of control relay 560 opened the operating circuit for timing relay 730 to effect the timed release of relays 730, 735 and 740 responsive thereto. Since these relays are of the slow-to-release type, a relatively large interval of time transpires prior to release of timing relay 735 and the completion of the circuit to the signal relay 475, this time interval being provided to insure a sufficient opportunity to seize an idle second selector.

As noted heretofore, if an idle selector is found, the switching relays 770, 775 and 785 operate and relay 780 at its contacts 780a completes an operating circuit for timing circuit relay 750, which extends from battery over the winding of relay 750, contacts 727, 741, 748 and 780*a* to ground. Timing circuit relay 750 operates, and at its contacts 751 completes an operating circuit for timing circuit relay 755. Relay 755 operates, and at its contacts 756 opens a point in the operating circuit to signal relay 475, prior to closure of that circuit by relay 735 in its restoration, in order to extend the time for selection of an idle second selector. Relay 755 at its contacts 757 also completes an operating circuit for timing circuit relay 745.

Relay 745 operates, and at its contacts 748 opens the operating circuits for timing circuit relay 750 and in turn 755 to restore same, and at its contacts 749 locks to ground over the contacts 780*a* of the operated switching relay 780. Timing circuit relay 745, at its contacts 746, connects ground over the contacts 766 of the operated one of the second selector allotter relays 765—765*i* to the selector units relay associated with that allotter relay, which in the given illustration is selector units relay 540. Timing relay 745, at its contacts 746, completes a circuit to the selector units relay 540 associated with the operated test relay 765, the circuit extending from battery over the winding of units relay 540, C576, contacts 560*p*, C576', contacts 766 and 746 to ground.

Selector units relay 540 operates and at its contacts 541, 542 and 543 connects the positive, negative and test conductors of the first selector 130 to second selector 136, at its contacts 544 completes an operating circuit for the conventional type call meter (not shown) to register the extension of a call thereto, the circuit extending from ground over contacts 560*d*, C564, contacts 544 and 533*c* to the call initiating conductor CM for the second selector 4000 group. Additionally, the units relay 540 at its contacts 546 completes an operating circuit for relay 480 for effecting release of the majority of the selector control relays, the circuit for release relay 480 extending from battery over the winding of relay 480, C417 and contacts 546 to the selector control link ground on conductor 317. Units relay 540 has also locked to the selector control link ground, the circuit extending from battery over the winding of relay 540, contacts 545, to the ground on conductor 317.

Relay 480 operates and at its contacts 481 extends the test conductor through the link to the second selector; and at its contacts 482 completes an operating circuit for link ground control relay 425 from the test conductor 313. Release relay 480 at its contacts 483 opens a point in the operating circuit for the selector relay S4000, which is now maintained operated over the self-holding circuit heretofore described.

Selector ground control relay 425 operates and at its contacts 426 and 427 opens points in the loop circuit to selector line relays 430 and 435, at its contacts 426*a* and 427*a* connects the subscriber positive and negative conductors through the selector 130 to the second selector 136. Relays 430, 435, 440 and 445 release in sequence. Relay 425 at its contacts 428 connects ground to the H conductor 317 to replace the ground removed therefrom as relay 440 is released, and at its contacts 429 removes the ground from the selector circuit to effect release of the selector control relays, excepting relays 425 and 480, which are maintained energized by ground connected to the test conductor 313 and H conductor 317, respectively. The seized second selector places ground on test wire conductor P(593) before relay 445 removes the ground connection from the test wire 317. The release of relay 485 releases the selector guard circuits and in turn effects release of relay 560 and the allotter circuit.

(*f*) *Selecting called subscriber's line*

The connection is now extended through the finder selector link 124 to the second selector 136, a pulsing path being extended through the selector 130 over conductors 311 and 312, contacts 426*a* and 427*a*, 541 and 542, 503*c* and 506*c* and conductors 591 and 592 to the second selector 136. As the subsequent digit "1" is dialed, the second selector 136 is operated in a manner similar to that described in regard to selector 130 to extend the connection through to a connector switch, such as 139, which is associated with line 119 of the called party Y. The digits "1" and "2" are then respectively dialed into the connector 139 to cause the switch to select the desired calling line 119 and a final digit "6" is then dialed into the connector to cause ringing current of a predetermined type to be applied to line 119 to signal the desired subscriber Y.

The connection is completed and ringing current removed from the line as the called party removes the receiver from his hookswitch. Release of the connection is established in a well known manner responsive to release of the connection by the calling party.

The exchange equipment is operated in a similar manner responsive to initiation of a call by a local subscriber to another local subscriber regardless of their class designations.

(*g*) *Extending call to operator service trunks*

Directory numbers 110, 112, 113, 114 are frequently reserved for use with operator service trunks and the selector circuit of the disclosure is adapted for such use. Briefly, numerals "11" of each code direct the call through the first selector to a special selector, and the third digit ("2," "3," "4," or "0") is registered in the selected special selector to route the call in conventional manner to the following services:

2—Information
3—Repair
4—Wire chief
0—C. L. R.

Referring now to selector 130, the seizure thereof and the energization of the first counting chain relay 610, responsive to receipt of the first impulse, is accomplished in the manner heretofore described. As transfer relay 455 restores following receipt of the single impulse, service relay 460 operates over a circuit extending from battery over relay 460, contacts 469, conductor 400, contacts 613, conductor 406, contacts 458, 483, conductor 407, contacts 672, 681, 691, conductor 410, contacts 448 and 429 to ground. Relay 460 operates and at its contacts 464 locks to ground, at its contacts 463 completes an operating circuit for relay 450, and at its contacts 462 prepares a circuit to relay 465.

Relay 450 operates and at its contacts 451 opens the energizing circuit for relays 610 and 670 to effect the release thereof. Relay 670 releases and at its contacts 671 completes an operating circuit for relay 465 which operates to release relay 450 and to restore negative potential to lead 404.

As the second digit "1" is received, the first counting chain relay 610 operates as before and as transfer relay 455 restores following receipt of the impulse, operator service relay S110 (Figure 5) operates over a circuit extending from battery over relay S110, C421, contacts 468, C400, contacts 613, C406, contacts 458, 483, C407, contacts 672, 681, 691, C410, contacts 448 and 429 to ground. Operation of the operator service relay S110 effects routing of the call to a group of special second selectors much in the manner that the routing to the trunk selectors was accomplished heretofore. As the third digit is subsequently dialled, the special second selection effects connection of the subscriber to a service in accordance with the value of the digit dialled.

*Interoffice calls*

In the extension of a call from exchange 110 to the neighboring exchange 111, the exchange equipment will be selectively operated in accordance with the particular class of the subscriber who is initiating the call.

Specifically, subscribers of the first class, such as subscriber X, are equipped with conventional dial apparatus and may accordingly make a call to the neighboring exchange 111 only by dialling the digit 0 to signal the operator in the conventional manner, and by having the operator extend the call over the associated operator's board, such as 144, a trunk circuit, such as 115, and a trunk line, such as 112, which interconnects with an incoming trunk circuit 112 and conventional switching apparatus in exchange 111.

The subscribers of the second class, such as subscriber W, are equipped with the special type equipment shown in Figures 2 and 3, and may initiate a call to the neighboring exchange 111 alternately by dialling the operator in the conventional manner described or by dialling a predetermined digit "9."

Considering first the establishment of calls to the neighboring exchange by way of the operator's position by either class of subscriber, the connection is initiated in conventional manner by removing the receiver from the hookswitch at the calling subscriber's station.

A finder selector link, such as 124, is seized and dial tone is returned to the subscriber. The operator's digit "0" is thereupon dialled and ten impulses are transmitted to operate the selector line relays 430 and 435 to control the selector counting chain to operate in the manner previously described. Following receipt of the ten impulses, the tenth counting chain relay 665 is maintained in the energized condition over its contacts 666, 685, C410, contacts 448 and 429 to link control ground. Sequence relay 670 is also energized over a circuit extending from counting chain battery on C404, the winding of sequence relay 670, contacts 687, 676, C410 and contacts 448 and 429 to selector control ground. Following the termination of the receipt of the digit 0 by the selector, relays 453 and 455 restore to complete the prepared operating circuit for the connector group relay S0000 over a circuit extending by way of battery, relay S0000, C600, contacts 668, C405, contacts 457, 483, C407, contacts 672, 681, 691, C410, contacts 448 and 429 to selector control ground. Relay S0000 locks to ground on conductor 317.

With operation of the selector group relay S0000, the conductors of the ten associated operator lines, such as line 144*a*, are extended to the selector switch 124 over contacts 501*j* and 535*j* and circuits to the aforedescribed metering equipment are also prepared. Selector group relay S0000, at its contacts 501*j*, closes an operating circuit for selector guard circuit control relay 485 which extends from battery over the winding of relay 485, C418, contacts 501*j*, C420, contacts 472, 448 and 429 to link ground. Relay 485 operates in the manner heretofore described to open the pulsing circuit to the counting chain to prevent subsequent dialing thereto, and to complete an operating circuit to its associated selector guard relay 700 in the selector group arrangement. The selector guard arrangement operates as described to prevent seizure of the trunks by several links of the group at the same time.

In the event that none of the other selectors of the first selector group are presently operative, the second selector allotter circuit will be operated in the manner heretofore described, and the selection of an idle operator's trunk will be made. Assuming that the first operator's trunk 144*a* is idle, selector units relay 540 will be operated by the allotter arrangement to forward the connection to the trunk 144*a*. Specifically, the positive, negative and test conductors are connected from the line finder 126 through the first selector 130 to the trunk 144*a*. The selector holding ground is removed and relays 425 and 480 of the selector are maintained in the operated condition.

With extension of the call to the operator's trunk 144*a*, a signal lamp at the operator's board lights in the conventional manner to indicate to the operator that subscriber service is desired on trunk 144*a*. With answering of the call and receipt of the subscriber's request, the operator thereupon extends the call over a trunk circuit such as 115 to the distant exchange 111.

*Establishing of a call to exchange 111 by a subscriber having special service privileges*

As indicated previously, subscribers having special service privileges may extend their calls to the distant exchange in the conventional manner or by-pass the operator in extending their calls to exchange 111, such calls being routed over the associated line circuit, such as 120, the finder-selector link, such as 124, over conductor 115*a*, the outgoing trunk, such as 115, and trunkline 112 to the equipment in exchange 111, access to a desired one of the parties in such exchange being obtained thereafter by dialing the directory number assigned to such party.

As previously noted, such subscribers are designated as belonging to a second or preferred class, and the substations of this class of subscribers are equipped with a special dial 200, such as is illustrated in Figure 2. As there disclosed, a set of special service control springs 214 and 215 are mounted adjacent the off-normal springs 212, 213*a* and 213*b*, in tangential relation to the outer periphery of the cam member 233. As the cam member is moved from its normal position by the subscriber in his registration of a digit, a projecting cam portion 234 causes the normally opened off-normal springs 212, 213*a*, and 213*b* to close. A brief interval after closing of the off-normal springs, the special service springs 214 and 215 are momentarily closed without effecting a functional operation at this time by reason of the open circuit effected by contacts between springs 210*a* and 210*b*.

On release of the dial after registration of the desired digit, the break wheel is returned to its normal position and the transmission of a number of make-break impulses corresponding to the digit registered is effected by the impulsing contacts between springs 211 and 210*b*. Immediately prior to the transmission of the break portion of the last impulse the off-normal cam member 234 engages the special service preparing springs 214 and 215 to close same in its passage thereby and to maintain the springs closed until the break impulse is completely transmitted. As the ninth break impulse is effected by the opening of springs 210*b* and 211 the special impulse defining springs 210*a* and 210*b* are closed, and maintained closed until the pawl 226 restores. It is noted that the contacts on special service springs 214 and 215 close a short interval before and remain closed a short interval after the ninth pulse to prepare the special service energizing circuit for such time. Accordingly, the closing and opening of the contacts on springs 210*a* and 210*b* during the ninth pulse effect the definition of the special service pulse.

With reference, now, to Figure 3, it is noted that the special dial 200 is connected to the incoming line circuit conductors in conventional manner, and that the impulsing circuit for such substation is connected to the line circuit 120 in conventional manner over the positive conductor 305, terminal 220*b*, contacts between springs 213*a* and 212, terminal 220*a*, terminal 219*c*, contacts between springs 211 and 210*b*, terminal 219*b*, hookswitch contacts 303 and negative conductor 306.

Terminal 221*b* for spring 215 of the special service springs is connected to ground and terminal 221*a* for special service spring 214 is adapted to be connected to the negative side of the line over terminal 219*a*, auxiliary special service spring 210*a*, spring 210*b*, terminal 219*b*, and hookswitch contacts 303.

Thus, with the simultaneous closure of the special service springs 214 and 215 and contacts 210*a* and 210*b* of the impulse springs, ground is connected to the negative conductor 306, while the circuit over conductor 305 is interrupted.

The co-operation of such equipment as located at substations, such as W, with a finder-selector link in extending a connection to a desired subscriber located in exchange 111, will now be considered. Subscriber W initiates the call in conventional manner by removing the receiver from the associated switch hook 301 to thereby effect the closure of contacts 302 and 303, and the completion of the described loop to the line circuit equipment 120. An idle finder-selector link, such as 124, is thereupon seized, and operation of the selector line relays 430 and 435 is effected in conventional manner over a circuit which extends from battery over relay 430, contacts 427, C312, through the line finder and line circuit equipment 126 and 120 respectively, C306, hook switch contacts 303, normally closed impulse contacts between springs **210*b* and 211, C321, transmitter T, the primary induction coil winding 310, C305, line circuit 120, line finder 126, C311, contacts 426, and over the winding of line relay 435 to ground. Line relays 430 and 435 in the selector effect operation of control relays 440 and 445 in the manner heretofore described, and relay 430 at its contacts 431** connects dial tone to the line to indicate to the subscriber that the first digit may be dialled.

The subscriber, at substation W, now dials the digit 9 which, as described, is the digit selected in the illustrated embodiment for providing automatic access to the trunk circuits extending to exchange 111. As the subscriber at the substation registers the digit 9 by rotating the dialling device, the off-normal springs 212, **213*a* and 213*b* are closed to complete a bridging loop across the incoming conductors 305 and 306** and to short out the transmitter T and receiver R to thereby effect an improved pulsing circuit in extension of the connection and to prevent dial clicks in the receiver.

Special service springs 214 and 215 are momentarily closed, but without effect at this time, inasmuch as the circuit connection to the line is interrupted at the impulse contacts on springs **210*a* and 210*b***.

As the finger wheel of the calling device is released, the break wheel returns counterclockwise (with reference to the front of the dial) towards its normal restored position. Impulse springs **210*b* and 211 are opened and closed with each passage of a tooth 230 and a successive indentation 231 in relation to pin 227, thus transmitting an impulse comprising a make and break period over the impulsing loop. Selector line relays 430 and 435 release with the receipt of each break portion and operate with the receipt of each make portion of the incoming impulses. Selector counting chain 601 operates responsive to receipt of the first eight digits to advance the counting chain to relay 655 and sequence relay 680**.

The eighth counting chain relay 653 operates and at its contacts **658*a* prepares a circuit for special service relay 490 and at its contacts 659 prepares a circuit for the ninth counting chain relay 660. A short interval immediately prior to the open period of the last impulse of the series (the ninth in this example), the special service springs 214 and 215 on the dial 200 (Figure 3) are closed by the passing of the cam portion 234. Cam portion 234 maintains springs 214 and 215 closed until a short interval immediately following the open period of the ninth regular pulse. The operation of pawl 226 on the ninth pulse opens the contacts between springs 211 and 210*b* for the ninth regular pulse and closes the contacts between springs 210*a* and 210*b*** for the special pulse.

Thus, the regular pulsing circuit of selector line relays 435 and 430 has been opened with the receipt of the break portion of the ninth pulse, but with the closing of special service springs 214 and 215 and **210*a* and 210*b*, an operating circuit is completed to line relay 430 alone to prevent its release, such circuit extending from battery over the winding of line relay 430, contacts 427, C312, line finder 126, line circuit 120, C306, contacts 303 of the hook switch, the closed impulse springs 210*a* and 210*b*, the closed special service springs 214 and 215 to ground. The operating circuit for line relay 435 is maintained open by springs 211 and 210*b***, and accordingly such relay is maintained inoperative at this time.

Line relay 435, in its restored condition, completes an operating circuit for the ninth counting chain relay in the manner described heretofore. With relay 435 released and relay 430 operated, circuits are closed to the special service relay 490, the operating circuit for the special service relay 490 extending from battery over contacts 451, C459, the winding of special service relay 490, contacts 496, C414, contacts **658*a*, C403, contacts 432, 437*a*, 448 and 429 to selector control ground. It is important to note that the operating circuit for the ninth counting chain relay 660 is normally completed with the ninth restoration of the line relay 435, and inasmuch as the line relay 430 and the special service relay 490 must also be operated during the single break period of the ninth pulse, the available time for the operation of relay 490 is rather close. Accordingly, to prevent faulty operation due to dials which may be slightly out of adjustment, an energizing circuit for the special service relay 490 is arranged to be prepared with the operation of the eighth counting chain relay 655 and the closure of contacts 658*a* responsive to receipt of the eighth break impulse. Thus, as the special impulse is received during the ninth break impulse the special service relay 490 is operated through contacts 658*a* simultaneously with the ninth counting chain relay 660 through contacts 659. Inasmuch as the eighth counting chain relay 655 is maintained energized for the entire period that the special service line relay 430 is de-energized during the ninth impulse, the special service relay 490 receives the entire effect of the special service pulse through contacts 658*a*. The equipment would also be operated if the special service relay 490 were connected to contacts 663 of the ninth counting chain relay 660. However, since the ninth relay 660 operates simultaneously with the receipt of the special service pulse, a slightly shorter energizing period for special service relay 490** would be effected.

As counting chain relay 660 operates it is effective at its contacts 661 to complete a holding circuit which extends from counting chain battery on conductor 404, over the winding of relay 660, contacts 661, 675, C410, contacts 448 and 429 to link control ground. Further the counting chain relay 660 at its contacts 663 prepares an operating circuit for trunk group selector relay S9000.

Special service relay 490 operates and at its contacts 491 completes a self-holding circuit over conductor 317, at its contacts 492 prepares an operating circuit to the selector group relay S9000, and at its contacts 493 interrupts a point in the circuit to signal relay 475 winding.

As the break period of the ninth impulse is completed, the loop circuit to the selector is re-established and line relays 430 and 435 reoperate.

A brief interval after receipt of the ninth impulse and termination of the impulses, transfer relays 453 and 455 restore to operate the trunk selector relay S9000 over a circuit extending from battery, over the winding of relay S9000, C413, contacts 492, C412, contacts 663, C406, contacts 458, 483, C407, contacts 692, C410, contacts 448 and 429 to link control ground.

Relay S9000 operates, and at its contacts 501L to 534L extends the positive, negative and P-wire circuits from the units relay contacts (which open) to the associated leads of the 9000 group of trunks; at its contacts **533*h* and 536*h* prepares circuits respectively to the call meter and overload meter circuits; at its contacts 535*h* completes a self-holding circuit which extends to the selector H conductor 317; and at its contacts 501*h* closes an operating circuit for selector guard circuit control relay 485. Relay 485 operates in the manner heretofore described to initiate allotting if other first selectors of the group are not controlling allotting at this time. Relay 485 also at its contacts 486 prepares a circuit for signal relay 475, so that in the event that a subsequent digit is dialled before selection may be accomplished, signal relay 475** will be operated thereover.

Specifically, should a digit be prematurely received, signal relay 475 and its associate relay 470 will operate and at their contacts 471 and 477 connect busy tone to the negative side of the line, as described. Signal relay 475 at its contacts 478 locks itself and relay 470 to ground on conductor 317, and will accordingly remain operated to prevent extension of a call by the link until the subscriber releases the connection.

Continuing with the call extension under normal conditions, in the event that no other finder selector link, such as 124, is simultaneously attempting to seize a second selector, the selector guard relay circuit 719 will effect operation of the trunk allotter control relay 560 to extend the test conductors of the trunk group to the second selector allotter circuit 705. The trunk circuits are marked in the same manner as the second selectors heretofore described; that is, when the trunk is busy, ground is connected to the conductor, and if the trunk is idle, low resistance battery is connected to the test conductor. With connection of the test conductors to the allotter circuit 705, therefore, the allotter circuit is operated in the manner heretofore described to select an idle one of the trunk circuits.

Assuming the first trunk circuit 115 of the group is in the idle condition, low resistance battery will appear on its test conductor to effect operation of test relays 760 and 765 and the operation of the selector units relay 540. Switch circuit relays 425 and 480 are responsively operated and the positive, negative and test conductors 311, 312 and 313 of the selector 130 are thereupon extended through the trunk circuit 115.

As the trunk is seized, a line relay (not shown) in the trunk circuit 115 operates over the circuit which is extended to the trunk by conductor 311, 312 and 313. The trunk circuit equipment operates in conventional manner to extend the call over the outgoing trunk 112 to establish connection with the automatic switching equipment thereat. As the subscriber dials the desired party's number, the trunk circuit line relay is operated a corresponding number of times to extend the pulses over the outgoing trunk 112 to the incoming selector 145. With dialling of the desired subscribers directory number, the call is extended in conventional manner over the incoming selector 145, second selector 146, connector 147 and line circuit 148 to the subscriber such as R. Thus, restricted service for individual substations on party lines is accomplished in an economical and simple manner.

*Selector restrictive operation*

It is, of course, obvious that other parties on the party line 118 may dial the digit "9" without obtaining similar service. Specifically, as a subscriber such as X, who has the conventional type dial equipment without special impulse springs, initiates a call in conventional manner to energize line equipment 120, the seizure of a finder-selector link, such as 124, is effected. As the subscriber X then dials the digit 9 into the selector, the selector counting chain will advance to relay 660 and the circuits will be prepared to the special service relay 490. However, with receipt of the break portion of the ninth impulse, line relay 430 will restore with line relay 435 and remain in the restored condition for the duration of the break period to prevent completion of the energizing circuit to the special service relay 490. As the break period is completed, line relays 430 and 435 re-energize and are held in the energized condition as a result of impulse termination. Transfer relays 453 and 455 restore after a brief interval and relay 455 at its contacts 458 completes an operating circuit for signal relay 475, the circuit extending from battery over relay 475, C419, contacts 493, C412, contacts 663, C406, contacts 458, 483, C407, contacts 692, C410, contacts 448, 429 to ground.

Signal relay 475 operates and at its contacts 477 connects busy tone to the line, at its contacts 478 locks up to ground in conductor 317, and at its contacts 479 completes an energizing circuit for signal relay 470. Relay 470 operates and at its contacts 471 energizes the busy tone equipment, and at its contacts 472 interrupts the circuit for ground to conductor 420.

The subscriber, on receipt of the busy tone, restores his receiver and effects the release of the connection in the manner heretofore described. It is seen therefrom that with the extension of a connection to the ninth level by the subscriber who is not equipped with special service facilities, busy tone will be returned and the connection blocked at the selector switch.

*Protective arrangement*

Figure 4:
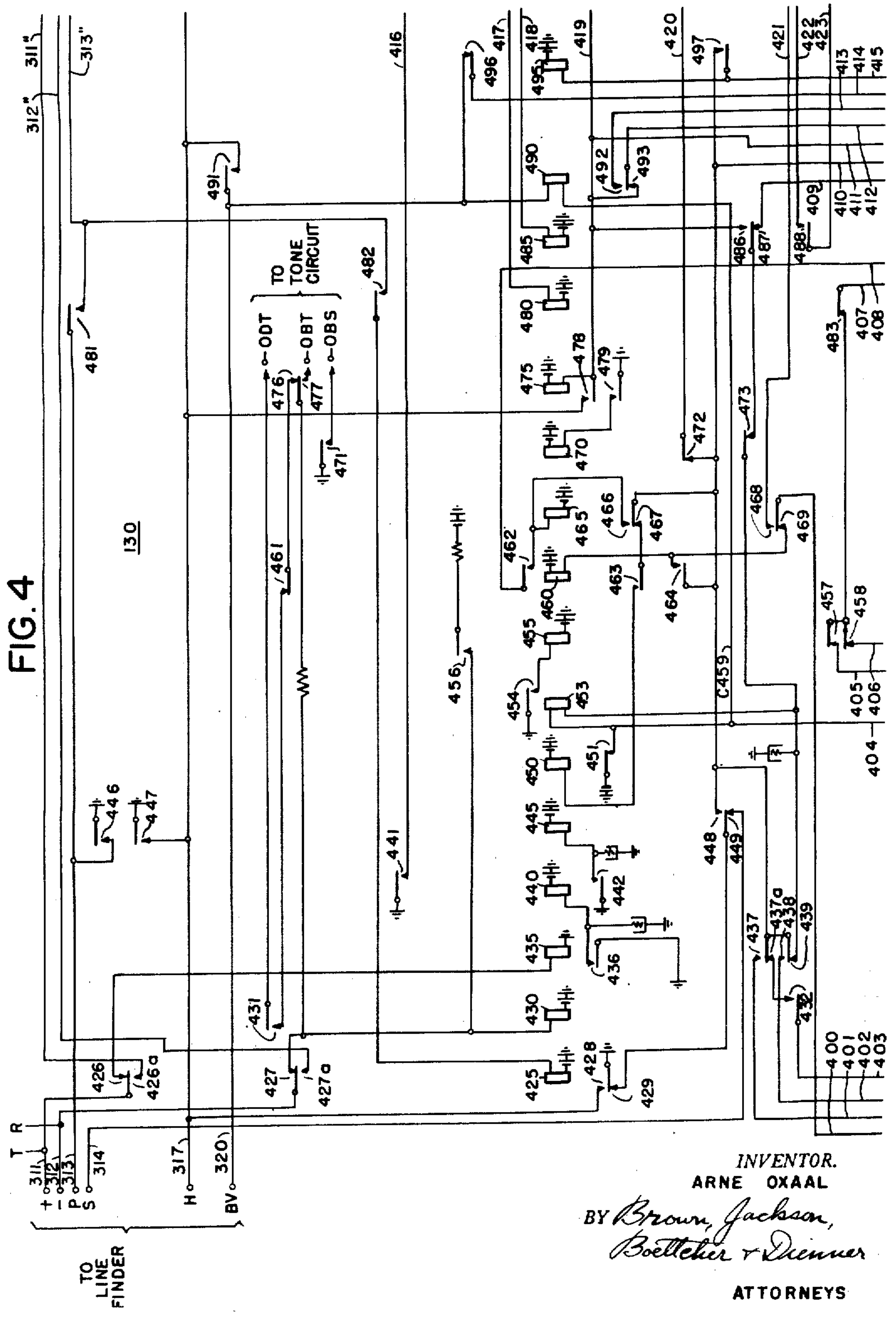
Figure 5:
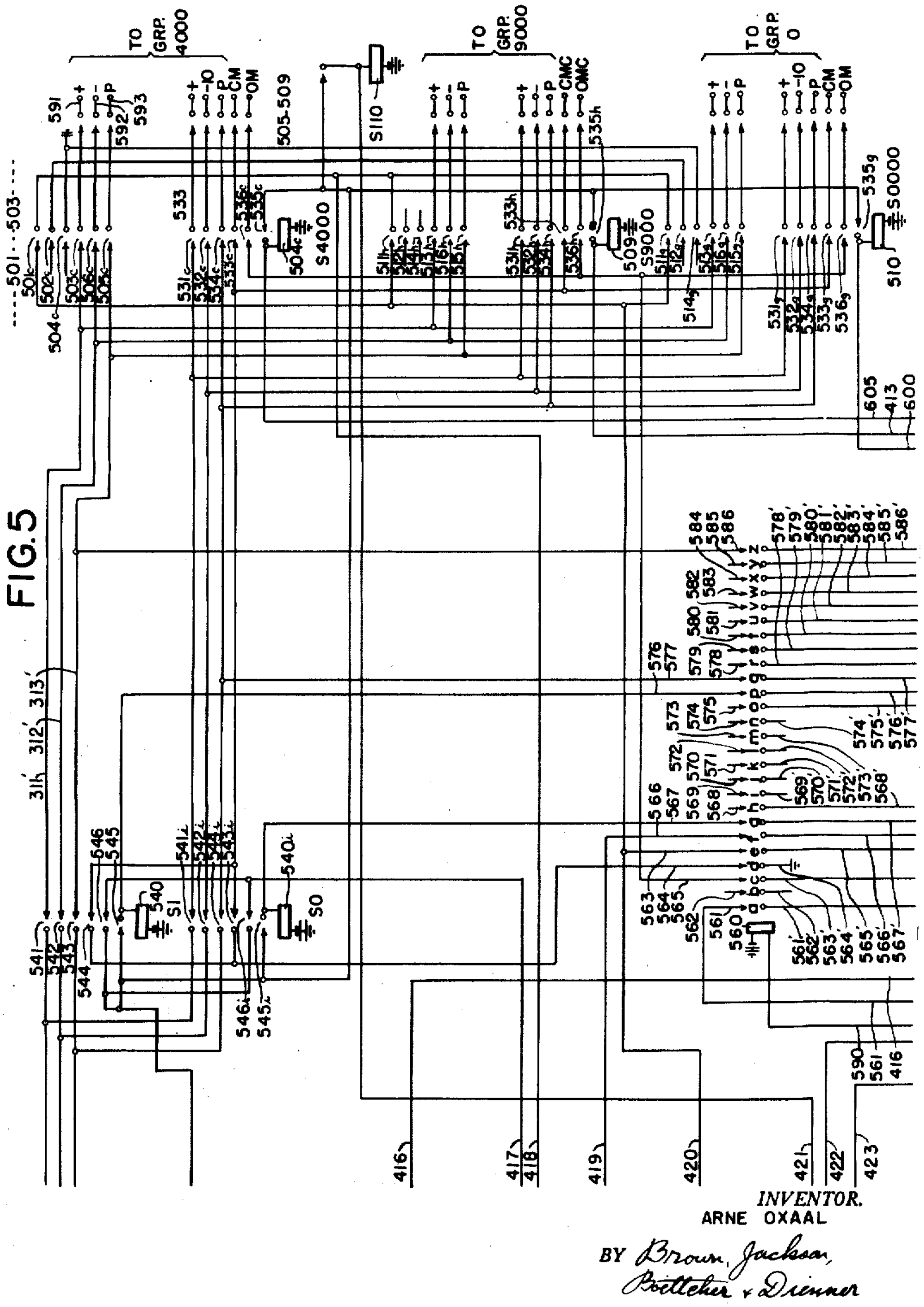
Figure 6:
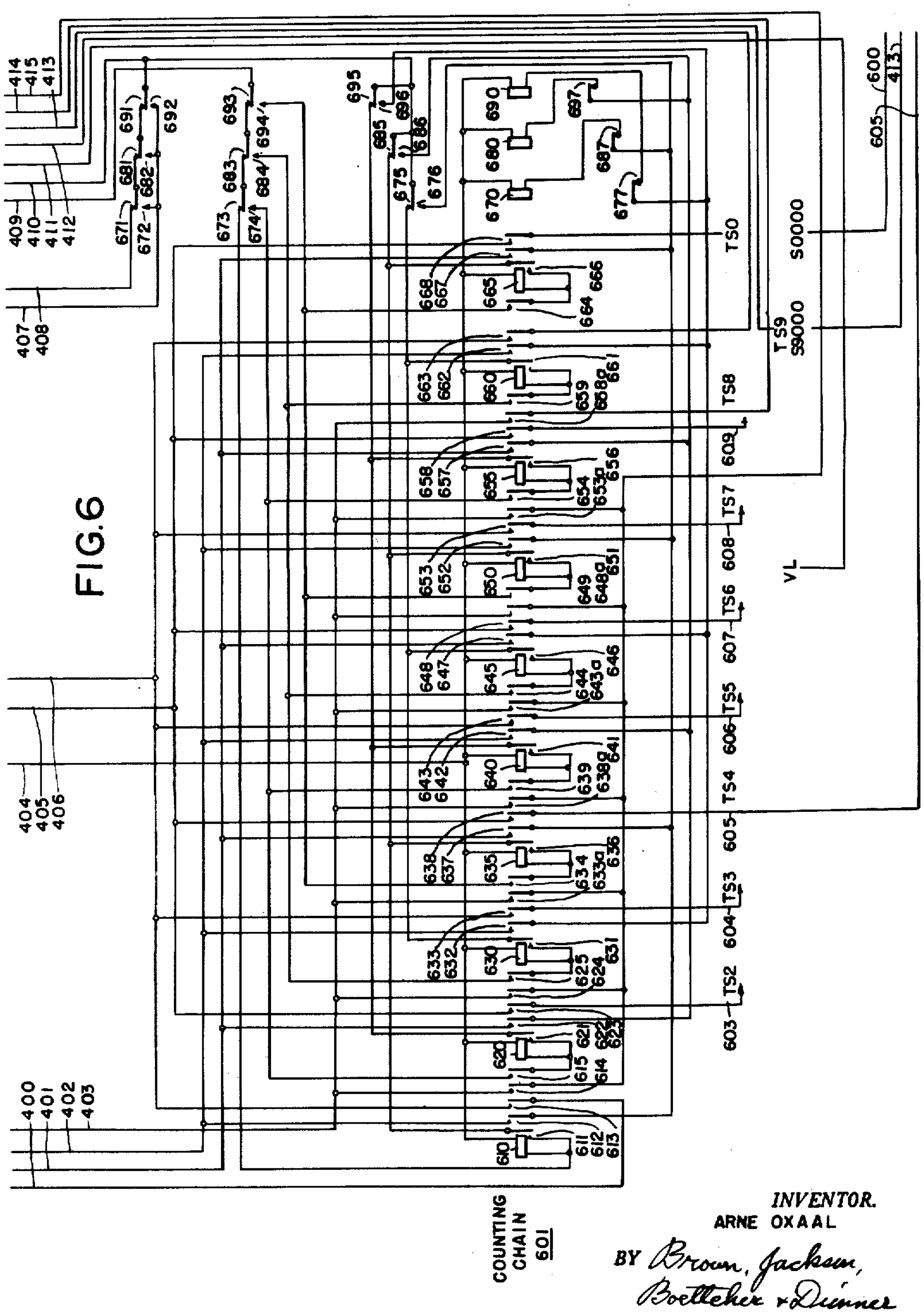

A particular feature of the new and novel arrangement for providing preferred service to predetermined parties is the manner in which subscribers not entitled to special service are prevented from fraudulently extending calls through the restricted level of the selector. For example, it is conceivable that fraudulent parties might attempt the application of ground to the one side of the line at the substation to achieve operation of the special service relay 490 when the digit "9" is recorded. A new and novel protective arrangement illustrated in the present embodiment is adapted to prevent such improper operation, and as shown in Figure 4, comprises a protective relay 495 which is faster operating than the counting chain relays, and having a plurality of individual and parallel operating circuits, each of which is controlled by the contacts of a particular one of each of the first seven counting chain relays in combination with the line relays 430 and 435. Thus, although line relay 430 will be operated if ground is connected to conductor 306 during the transmission of any of the first seven impulses, the protective relay 495 will operate over the aforementioned parallel circuits to prevent completion of the connection to an outgoing trunk.

For example, if ground is connected to conductor 306 at the substation during the open portion of the first incoming impulse, line relay 430 will be in the operated position and line relay 435 will be in the restored condition. An operating circuit is thereupon completed to the protective relay 495, which circuit extends from battery over protective relay 495, conductor 415, contacts 614 (the first of the parallel operating circuits which extend over the counting chain relay contacts 614, 624, etc.) C403, contacts 432, 437*a*, 448 and 429 to selector control ground.

Protective relay 495 operates and at its contacts 496 opens a point in the operating circuit to special service relay 490 to prevent further operation thereof, and at its contacts 497 completes a self-holding circuit which extends from battery over the winding of relay 495, contacts 497, 448 and 429 to selector control ground. Thus, if conductor 306 is again grounded as the ninth impulse of the dialled digit is received, contacts in the operating circuit to the special service relay 490 are closed by the line relays 430 and 435 as a result of the fraudulent ground application, but the circuit cannot be completed as it is interrupted at contacts 496, and the special service relay 490 is prevented from operating. Additionally, after the transmission of the impulses is completed, line relays 430 and 435 are maintained energized and the transfer relays 453 and 455 restore to complete an operating circuit for signal relay 475, which extends from battery over the winding of signal relay 475, contacts 493, conductor 412, contacts 663, conductor 406, contacts 458, 483, conductor 407, contacts 692, conductor 410, contacts 448 and 429 to selector control ground. Signal relays 475 and 470 are operative in the manner heretofore described to apply busy tone to the line to indicate to the calling party fradulent maneuver has been detected and that the call has not reached the restricted service trunk level. Release of the equipment is effected with restoration of the receiver by the calling subscriber.

It is, of course, apparent that if conductor 306 is permanently grounded, line relay 435 will be shunted and operation thereof will thereafter be prevented. Hold relays 440 and 445 will accordingly release and in turn effect release of the link equipment.

Thus, it is seen that the novel protective circuit of the invention provides reliable protection against fraudulent use of the equipment by unscrupulous parties and specifically against simulating the possession of special service equipment by connecting ground to the negative line conductor.

*Special service—group and line basis*

While the foregoing is directed to the provision of special service for individual parties on private and mixed party lines, it is also possible to provide subscribers with special service facilities on a party line basis; that is, in the event that a large number of party line subscribers in a given area request such service, it may be more practical to provide a certain number of party lines which provide such service in the conventional manner and carry the overflow on party lines of a mixed nature by utilizing the described circuits.

With reference to the somewhat conventional line finder equipment which is shown in the patent to J. H. Voss, No. 2,317,833, issued April 27, 1943, the manner in which both mixed and unmixed subscribers line may be included in illustrated exchange will become evident from the following disclosure.

As shown therein, restricted service is provided to given subscriber lines by extending a restricted service lead C585 between the line finder and the connector, which lead is connected to ground with operation of the auxiliary group relay R510.

In the selector arrangement disclosed in Figures 4, 5, 6 and 7 of the present application, conductor 320 corresponds to conductor C585 of the Voss patent and extends between the special service relay 490 and the auxiliary group relays (not shown) associated with those ten line groups having only subscribers entitled to the preferred service. Thus, if a call is initiated by a subscriber connected to such type party line, the auxiliary group relay in the line finder will operate to place ground on the restricted service lead 320 and special service relay 490 will operate. Accordingly, when the predetermined special service digit of nine impulses is dialled by the subscriber, the ninth relay of the counting chain 660 in operation will effect closure of the circuit prepared by the special service relay 490 to the selector group relay S9000. An idle trunk is then seized, in the manner heretofore described, and the connection is extended to the equipment in the distant exchange 111 to permit the calling subscriber to dial the directory number of the desired party. It is also possible for lead 320 to pass through combinations of line finder tens and units relay contacts to operate relay 490 when particular lines originate calls, thus giving trunk group 9000 access to all parties on the line.

It is thus apparent that it is possible to provide an exchange in which special service privileges may be provided for some lines on a group basis, or on a line basis; and also may be provided for other lines on an individual subscriber basis, that is the equipment at each subscriber station determines the nature of his service. Through such equipment the problems and dictates of complicated exchange layouts are readily and dependably solved. An important feature is the simple and inexpensive nature of the various circuit arrangements which renders the novel equipment readily adaptable for commercial application.

*Provision of more than two subscriber classes*

According to a further feature of the invention, several levels of the first selector switch, such as 130, may be reserved for use with special service facilities and each special service may be made available to subscribers individually and in various combinations, the main feature of such arrangement being the ability to provide a more flexible type exchange in an economical and dependable manner. Several different embodiments are shown in Figures 10—13 inclusive, it being apparent from a cursory examination of the selector circuits shown therein and the modified cam arrangement shown in Figure 9 that a minimum of circuit modification is required in providing any one of these arrangements. Such structure is extremely practical and economical in use, and the flexibility of the control circuits greatly enhances their value in the field.

Each of the disclosed modifications has a special qualification which particularly adapts such arrangement for use in a particular type of exchange having individual traffic problems.

Figure 10:
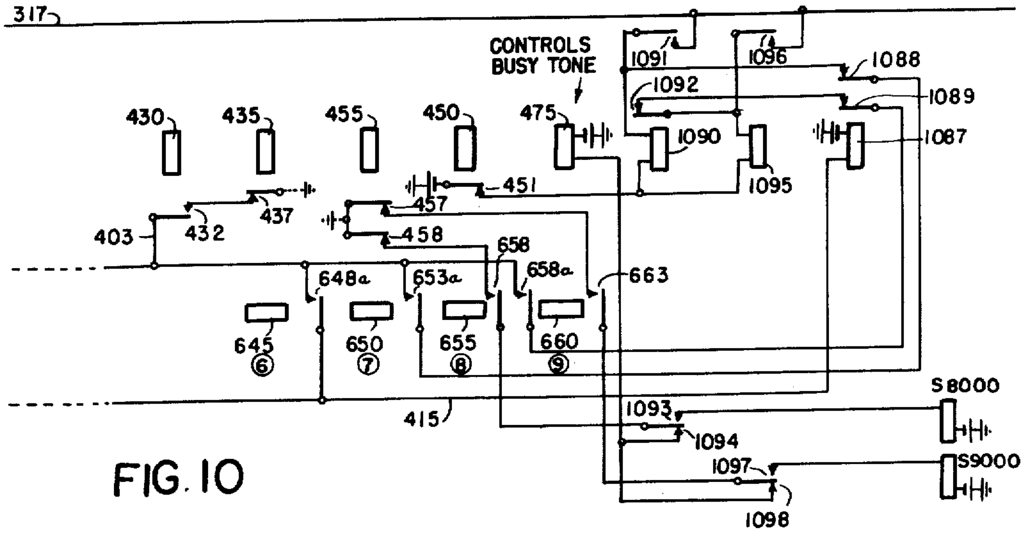

The modification shown in Figure 10, for instance, is adapted to provide access to special service facilities over any two selector levels, and in the given illustration, over the eighth and ninth selector levels. Through corresponding adaptation of the control circuits, the subscribers may be divided into three classes, that is, a first class having access to neither of the special service levels, a second class of subscribers having access to the eighth special service level, and a third class having access to the ninth special service level. Fraud control similar to that in the first embodiment is also included in this modification. In this particular embodiment no one subscriber can be granted access to more than one of the special service levels. The advantageous application of this type arrangement in the outlying areas of metropolitan communities is immediately apparent.

Figure 11:
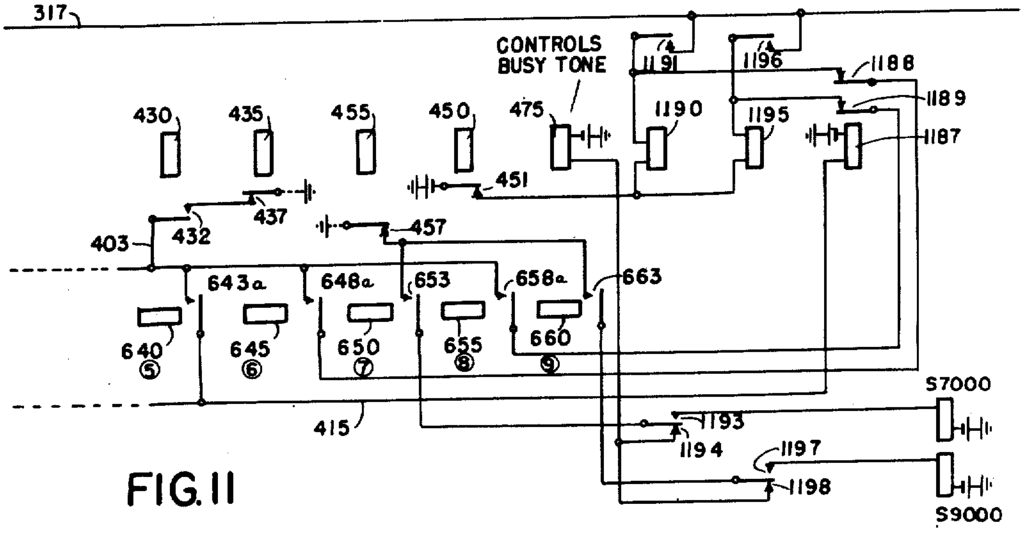

In the arrangement disclosed in Figure 11, two noncontiguous levels have been set aside for special service use. The subscribers are divided into four classes by proper modification of the individual dial units, the classes including a first class which does not have access to either of the special service groups, a second class which has access to the special service associated with the seventh level, a third class having access to the special service associated with the ninth level, and a fourth class having access to the special services associated with both the seventh and ninth levels. Fraud control is again provided in this embodiment. A desirable advantage of this particular arrangement is the ability to provide one extra subscriber class with the same equipment as used in other embodiments and this arrangement has particular adaptation in metropolitan areas.

Figure 12:
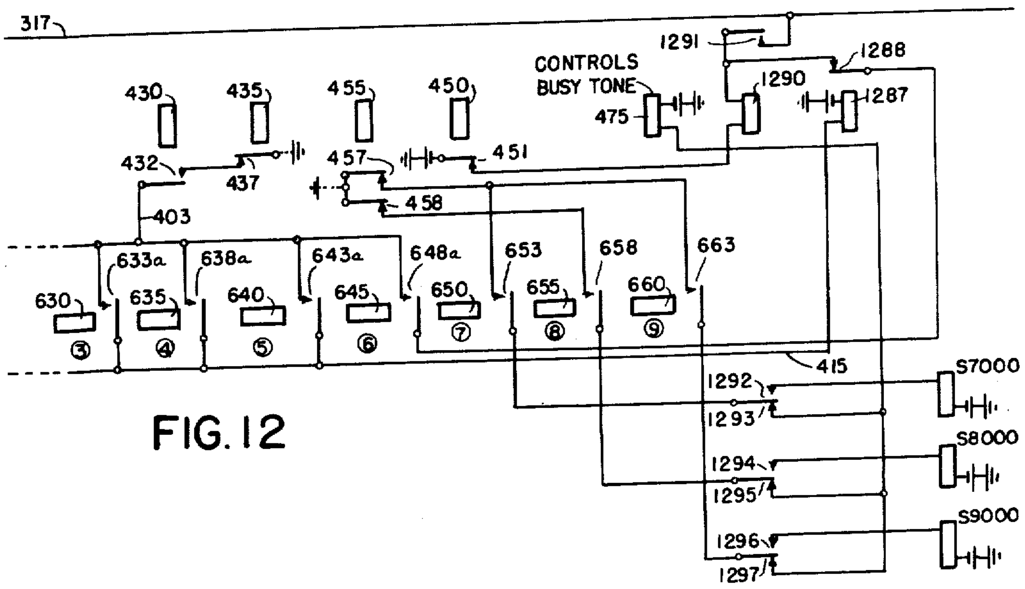

In a further modification set forth in Figure 12, a series of levels are set aside for use with special service facilities and two classes of subscribers are set up in the exchange. A first class is restricted from all of the special services and a second class is arranged to have access to all of the restricted levels, which in Figure 12 include the seventh, eighth and ninth selector levels.

It is noted that each of the embodiments shown in Figures 10 to 13 require the provision of a dial having a special cam member mounted thereon for each of the preferred subscribers, such requirement being in contrast to the previously described arrangement in which the off-normal cam also served as the special service impulse transmitter.

With reference now to Figure 9, there is shown therein a class identification cam member 900 which is adapted for use with a conventional dial to effect the transmission of the required special pulses at the predetermined time period.

The class identification cam 900 in each instance mounts a projection, such as 903, at one or more of the points along the outer periphery of the cam member which are indicated by the numerals 1 to 0 inclusive.

The cam member 900 is arranged to have a slightly larger diameter than the off-normal cam and is preferably mounted between the break wheel 229 and the off-normal cam 233.

A set of special service springs, such as 214 and 215, are mounted in tangential relation to the cam outer periphery and outwardly of the path of movement of the off-normal cam, and within the path of movement of the cam projections, such as 903. Thus, as the dial is rotated to register a digit and released to transmit same, the projections, such as 903, will effect operation of the special service springs at a predetermined time during the transmission of the digit, and the off normal cam will not disturb the outwardly displaced springs.

For use with the disclosed selector arrangement, the projections when mounted at the points indicated by the numerals are located so as to effect the transmission of a special pulse during the open period of the pulse corresponding to that number. That is, on a dial on which the projection, such as 903, is located at the point marked by digit 7 in Figure 9, projection 903 will effect closure of the special service springs 214 and 215 as the operating impulse springs are effecting the transmission of the open period of the seventh impulse of the digit. Further details of the dial modifications for each embodiment will be described as each arrangement is considered in order.

It is to be understood, of course, that the off-normal cam may also be used in the manner of the first embodiment set forth herein in combination with a cam such as 900 to effect the transmission of additional pulses without departing from the scope of the invention.

(*a*) *Single pulse—three subscriber classes*

The first modification of the invention is basically set forth in Figure 10, the disclosure having been restricted to a schematic showing of the pertinent selector switching units for purposes of a clear, concise disclosure.

With reference now to Figure 10, it is apparent that the selector equipment thereat is arranged to provide special service facilities for preferred subscribers over the eighth and ninth selector levels. The exchange has three classes of subscribers: those who do not have access to either of these special service levels, those who have access to the eighth special service level, and those who have access to the ninth special service level.

The dials at the subscriber substations will be modified in accordance with the particular class to which they are assigned. Briefly, parties of the first class who are restricted from each of the special services will have a conventional dial; the parties having access to the eighth level will have a cam member 900 (Figure 9) on which a projection, such as 903, will be located at the point indicated by peripheral numeral 8; and the parties of the third class having access to level 9 will have a cam member 900 having a projection, such as 903, disposed at the point indicated by peripheral numeral 9.

Considering first the extension of a call to the eighth special service level by a party of the second class having access thereto, with the registering of the digit eight on the dial and the release thereof a series of eight make-break impulses is transmitted to the selector, such as 130, in the manner heretofore described. Additionally, the cam projection, such as 903, which is located at the peripheral point indicated by the numeral eight in Figure 9, will effect the transmission of a ground pulse over one side of the line during the break period of the eighth pulse.

Selector line relays 430 and 435 advance the counting chain to the seventh counting chain relay 655, and as the one side of the line is grounded during the break portion of the eighth pulse, line relay 430 is responsively energized and line relay 435 is responsively de-energized. In that the seventh counting chain relay 650 is operated at this time (the eighth relay 655 is operated by the de-energizing of line relay 435 practically simultaneously with the receipt of the special pulse) an energizing circuit is completed for the first special service relay 1090 to prepare for the extension of the calling line to the special service associated with the eighth level. The energizing circuit for relay 1090 extends from battery over contacts 451, the winding of special service relay 1090, contacts 1088, contacts 653*a*, conductor 403, contacts 432 and 437 to ground. Special service relay 1090 operates and at its contacts 1091 locks to link selector ground on conductor 317, at its contacts 1092 interrupts the energizing circuit for the second special service relay 1095, at its contacts 1093 prepares a circuit to the selector relay S8000 for the eighth level, and at its contacts 1094 interrupts a point in the circuit for the busy control relay 475.

Transfer relay 455 restores in known manner following termination of receipt of the eight incoming impulses, and is effective at its contacts 458 to complete the prepared operating circuit for the selector relay S8000 for the eighth level, the circuit extending from battery over the winding of relay S8000, contacts 1093, 658 and 458 to ground. Extension of the call by the selector is thereafter accomplished in the conventional manner.

It should be pointed out at this time that the special service relays 1090 and 1095 and the fraud control relay 1087 are necessarily faster in operation than the counting chain relays. In the given instance, for example, it is essential that the special service relay 1090 operate to interrupt the circuit to the second special service relay 1095 prior to closure of the circuit thereto by the eighth counting chain relay 655.

The extension of a call to the special service associated with the ninth level by a subscriber of the third class is effected in a similar manner. Specifically, the subscribers of this class have a cam member such as 900 having a projection such as 903 disposed at the point on the dial indicated by peripheral numeral nine. As the dial of such subscriber is moved to register digit nine and released to effect the transmission of the digit, nine make-break impulses are applied to the line and one side of the line is grounded as the cam, such as 903, closes the special service springs 214 and 215 during the break portion of the ninth pulse. Selector line relays 430 and 435 advance the counting chain to the eighth counting chain relay 660, and as the break period of the ninth pulse is effected to effect operation of the ninth counting chain relay 660, one side of the line will be grounded by the subscriber's special service springs in the manner heretofore described, whereupon line relay 430 will responsively operate and line relay 435 will be released.

With the line relays in this position, positive potential is applied through the closed contacts 658*a* of the eighth counting chain relay 655 to the special service relay 1095 associated with the ninth level. Special service relay 1095 operates over a circuit extending from battery over contacts 451, the winding of relay 1095, contacts 1092, 1089, 658*a*, conductor 403 and contacts 432 and 437 to ground.

Relay 1095 operates and at its contacts 1096 completes a holding circuit to selector link ground over conductor 317, at its contacts 1097 prepares a circuit for the ninth selector relay S9000, and at its contacts 1098 interrupts a point in the circuit for the signalling relay 475.

As the transfer relay 455 now restores following receipt of the nine impulses, it is effective at its contacts 457 to complete an operating circuit for the selector relay S9000, the circuit extending from battery over relay S9000, contacts 1097, contacts 663 and contacts 457 to ground. The further switching effected with the operation of the selector relay S9000 to extend the connection to the desired special service is accomplished in a conventional manner.

Fraud control is accomplished in the present modification through the means of a fraud control relay 1087 which is arranged to be controlled by a series of parallel circuits extending through the contacts on the first to sixth relays of the counting chain. Specifically, in the event that operation of the special service relays 1090 or 1095 is fraudulently attempted by the placing of ground on the proper line conductor, and such ground is prevalent during the open period of any one of the first seven pulses, a circuit will be completed to the fraud control relay 1087 over the closed contacts of the particular counting chain relay which is operated. For example, if ground were placed on the proper line conductor during the open period of the sixth pulse (the fifth counting chain relay being operated at this time), the fraud control relay 1087 would be immediately operated over a circuit extending from battery over relay 1087, conductor 415, contacts 648*a*, conductor 403, contacts 432 and 437 to ground. The fraud control relay 1087 operates and at its contacts 1088 opens the operating circuit for the special service relays 1090 and 1095 to prevent the operation thereof, even though ground is applied to the line conductor during the subsequent eighth and ninth impulses. Signalling relay 475 is operated in the manner heretofore described as the impulse transmission is terminated to indicate to the subscriber that his fraudulent attempt has failed. Accordingly, the operation of the selector relays S8000, S9000 which control the special service facilities is prevented should ground be fraudulently applied at any time except the precise moment that the single assigned break impulse is being effected.

In the event that a simulated fraudulent pulse is transmitted during the open period of the seventh pulse, the contacts 648*a* of the sixth counting chain relay 645 are effective to energize the fraud control relay 1087. Practically simultaneously the seventh pulse is effecting energization of the seventh counting chain relay 650, but since the fraud control relay 1087 is a fast operating relay, it will be effective to open the circuits to the special control relays 1090 and 1095 so that application of the ground through contacts 653*a* of the seventh relay 650 as it operates will not operate the special control relay 1090 and the fraudulent attempt is accordingly thwarted.

Considering now an attempt by a restricted subscriber of the first class to gain access to either of the special service groups, it is apparent that as the selector responds to the dialling of the special service numbers 8 or 9, the counting chain is advanced to the eighth counting chain relay 655 or the ninth counting chain relay 660. In that the subscriber's equipment is not equipped to transmit the special service impulse required, the special service relay for the desired facility is inoperative, and following the termination of the receipt of the impulses the transfer relay 455 will restore to close contacts 457 and 458 and to thereby connect ground over the desired contacts of the operated one of the counting chain relays (655 or 660) to effect the operation of the signalling relay 475. Signalling relay 475 operates over a circuit extending from battery, the winding of relay 475, contacts 1098 or 1094, contacts 658 or 663, contacts 457 or 458 to ground, and is effective in the manner heretofore described to transmit busy tone over the subscriber connection to indicate to the party that the level is restricted to that substation. The equipment is subsequently restored with restoration of the instrument at the substation by the subscriber.

Similarly, in the event that a subscriber of the class which is entitled to access to level 9 should dial the digit 8, the special service relay 1090 will not be operated and the signalling relay 475 will be energized over a circuit extending from battery over the winding of relay 475, contacts 1094, contacts 658 and 458 to ground. The subscriber will be thus informed that a restricted level has been seized. Restoration of the equipment follows with restoration of the subscriber handset.

Similarly, in the event that a party who is entitled to have access to the eighth level should dial the digit 9, although the special service relay 1090 for the eighth level will be operated, it is the ninth counting chain contacts 663 which are closed as the transfer relay 455 restores and, accordingly, neither of the selector relays S8000 or S9000 will be operated. Instead, signalling relay 475 will be operated over a circuit extending from battery over the winding of relay 475 and contacts 1098, 663 and 457 to ground. The subscriber is informed thereby that the level is restricted and that restoration of the substation equipment to restore the exchange equipment is in order.

It is seen from the foregoing that the equipment, when arranged in the manner of Figure 10, is operative to effect the provision of two restricted levels and three classes of subscribers, access to any of the restricted levels being gained through the comparatively simple expedient of transmitting a single special pulse concurrently with the operating pulses.

In brief summary, it is noted that this arrangement provides three classes of service, one class having no access to the special service of the eighth and ninth levels, a second class having access to the special service of the eighth level and a third class having access to the special service of the ninth level. The selector, when modified in accordance with the arrangement shown in Figure 10, will not be able to provide any one subscriber with access to more than one restricted selector level. The main advantage of this particular application is the ability to arrange the trunk groups in contiguous levels whereby fraud control may be extended to a higher sequence relay in the counting chain arrangement.

*Two restricted levels—four classes of service*

In a further embodiment of the invention shown in Figure 11, two non-contiguous selector levels (the seventh and the ninth levels in this disclosed arrangement) are restricted for special service use, access to each of which is attained by the transmission of a single individual special service pulse. Any other two non-contiguous levels may be used in this manner, levels seven and nine having been arbitrarily chosen for purposes of illustration. Four classes of service are offered by such arrangement—

Class 1—subscriber is restricted from access to special service levels 7 and 9
Class 2—subscribers have access to special service level 7
Class 3—subscribers have access to special service level 9
Class 4—subscribers have access to special service levels 7 and 9.

Each of these classes will now be separately considered.

The subscribers of the second class having access to special service trunk level 7 will have a special cam member, such as 900 (Figure 9), associated with their dial device 200, the projection, such as 903, on the cam member being disposed at the point indicated by peripheral numeral 7 so as to operate the special service preparing springs such as 214 and 215 during the break period of the seventh impulse. A pulse defining spring, such as 210*a* and 210*b* defines the time of transmission of such pulse.

Subscribers having access to the ninth level will have a special cam member, such as 900, associated with the dial device 200 on which the extending projection, such as 903, is located at the point indicated by peripheral numeral nine whereby the special service preparing springs 214 and 215 and pulse defining springs 210*a* and 210*b* effect transmission of a special pulse during the break period of the ninth impulse.

Subscribers of the fourth class will have a two pronged cam so that special pulses will be transmitted during the break period of impulses seven and nine.

Subscribers of the first class having access to neither of the levels will have a conventional type dial which is not adapted to transmit special pulses of the required type.

Assuming first the placement of a call to restricted level seven by a subscriber of the second class, with reference to the pertinent portions of the modified selector 130 shown in Figure 11, it is apparent that with the receipt of the first six impulses, line relays 430 and 435 will advance the counting chain to the seventh counting chain relay 650. Just prior to transmission of the break period of the seventh pulse by the dial, the projection, such as 903, will move past the special service springs 214 and 215 to prepare the equipment for transmission of a grounded impulse over the negative side of the line as the pulse preparing springs 210*a* and 210*b* are closed.

Selector line relay 430 is operated and line relay 435 is restored responsive to receipt of the special pulse and a circuit is completed over the closed contacts 648*a* of the sixth counting chain relay for the special service relay 1190 which is arranged to grant access to the restricted seventh level. Specifically, the circuit extends from battery over contacts 451, the winding of relay 1190, contacts 1188, contacts 648*a*, conductor 403, contacts 432 and 437 to ground.

Special service relay 1190 operates and at its contacts 1191 locks itself to link selector ground over conductor 317, at its contacts 1193 prepares an operating circuit for the selector relay S7000, and at its contacts 1194 opens a point in the operating circuit for the signalling relay 475. Counting chain relay 650 operates as the seventh pulse period is effected (practically simultaneously with the operation of special service relay 1190), and as the transfer relay 455 subsequently restores following the termination of receipt of the seven incoming impulses, an operating circuit is completed to the trunk selector relay S7000 to effect the energization thereof, such circuit extending from battery over the winding of relay S7000, contacts 1193, contacts 653 and 457 to ground. Thus only by precision transmission of a special pulse for a predetermined momentary portion of the transmission of the operating pulses may access be gained to the restricted level seven.

In the event of the dialling of the digit 7 by parties (classes one and three) not having the special projection 903 located at the point indicated in Figure 9, the line relays 430 and 435 will advance the counting chain to the seventh relay 650, in conventional manner, but in that a special service pulse is not transmitted by the dial, special service relay 1190 will not be operated. Accordingly, an energizing circuit will not be prepared for the selector relay S7000 associated with the special service trunk and as the transfer relay 455 restores following receipt of the impulses the selector relay S7000 will not be operated. Instead the transfer relay 455 is effective at its contacts 457 to complete an operating circuit for the signalling relay 475, such circuit extending from battery over the winding of relay 475, and contacts 1194, 653 and 457 to ground. Signalling relay 475 operates in the manner heretofore described and effects transmission of busy tone to the calling subscriber to indicate to the party that the call has been extended to restricted selector level. The equipment is restored as the subscriber subsequently restores the instrument at the calling substation.

Assuming now the placement of a call by a subscriber of the third class having access to the special service associated with the restricted ninth level. As the call is placed and the first eight impulses are received by the selector, line relays 430 and 435 will operate to advance the counting chain to operate the eighth counting chain relay 660. As the open period of the ninth impulse is being transmitted the pulse defining springs 210*a* and 210*b* close to transmit a special pulse over the circuit prepared by the closure of special service contacts 214 and 215 by the projection 903 located on the cam 900 at the point indicated by peripheral numeral 9 (Figure 9). Line relay 430 is responsively operated and line relay 435 responsively released whereupon ground potential will be applied to the special service relay 1195 over a circuit extending from battery over contacts 451, the winding of relay 1195, contacts 1189, contacts 658*a* of the eighth counting chain relay 655, conductor 403, and contacts 432 and 437 to ground.

Special service relay 1195 operates and at its contacts 1196 locks itself to link selector ground over conductor 317, at its contacts 1197 prepares a circuit for the selector relay S9000, and at its contacts 1198 opens a point in the circuit to the signalling relay 475.

The ninth counting chain relay 660 operates during the period of transmission of the ninth impulse and as the transfer relay 455 restores shortly thereafter, it is effective at its contacts 457 to complete an operating circuit to the selector trunk relay S9000 extending from battery over the winding of relay S9000, contacts 1197, contacts 663 of the operated ninth counting chain relay 660, and contacts 457 to ground. The switching operations to extend the calling line to the special service associated with the ninth level as selector relay S9000 operates are similar to those heretofore described.

In the event that a subscriber (classes one and two) not having access to the special service facilities afforded by the ninth level should dial the digit 9, the apparatus will be operative to refuse the connection and to transmit a busy tone signal to such subscriber. Specifically, failing the equipment to transmit a special service impulse, line relay 430 will not be operated in the manner heretofore described, and as the counting chain is advanced to the ninth counting chain relay 660, the operating circuit for the special service relay 1195 associated with the ninth level will be interrupted by open contacts 432 on the restored line relay 430.

Accordingly, as the transfer relay 455 releases following the receipt of the nine impulses, it is effective at its contacts 457 to complete an operating circuit for the signalling relay 475, the circuit extending from battery over relay 475, contacts 1198, and contacts 663 and 457 to ground. Busy tone is applied to the subscriber line by the signal relay 475 and the subscriber is informed that a call has been offered to a restricted selector level. The equipment is released as the subscriber subsequently restores the equipment at the substation.

Subscribers of the fourth class having access to both of the special services will have a dial cam member 900 having extensions, such as 903, at the points indicated by peripheral numerals 7 and 9. The extension of a call to either of the restricted seventh and ninth levels will be accomplished in the described manner, it being apparent that if the party dials the digit 9, special service relay 1195, and the ninth counting chain relay 660 will be operated so that as the transfer relay 455 restores the selector relay S9000 will be energized to extend the call over that level. Although the special service relay 1190 is also prepared, the seventh counting chain relay 650 will be inoperative at the time the transfer relay 455 restores and accordingly the preparation of the circuit to selector relay S7000 will be of no consequence. In the event that digit 7 is dialled by such subscriber, the seventh counting chain relay 650 and special service relay 1170 will be operative to prepare a circuit to selector relay S7000. As the transfer relay 455 restores, the selector relay S7000 operates to extend the call over the seventh level.

Fraud control is again provided in this embodiment through the means of a special fraud control relay 1187, the fraud control relay 1187 being arranged to be controlled by a series of parallel circuits extending over the first to fifth counting chain relays of the selector much in the manner heretofore described. Should a fraudulent subscriber apply ground to the proper side of the line during an impulse other than the proper impulse, line relay 430 will operate to energize the fraud control relay. For example, if ground is applied during the open period of the fifth transmitted impulse, line relay 430 energizes and line relay 435 releases to effect the connection of ground potential to the fraud control relay 1187 over a circuit extending from battery over the winding of relay 1187, conductor 415, closed contacts 643a of the fifth counting chain relay, conductor 403, contacts 432 and 1187 to ground. Fraud control relay 437 operates, and at its contacts 1188 and 1189 opens the operating circuit for special service relays 1190 and 1195 to prevent the operation thereof by the fraudulently applied ground, and accordingly to prevent extension of the call to either of the special service levels 7 or 9 should the ground still be applied as the levels are reached. Busy tone is applied to the calling subscribers line in a manner heretofore described to indicate that the fraudulent attempt has been detected. The equipment is released responsive to the restoration of the equipment at the subscriber substation.

It is apparent from the foregoing that four classes of service are available to subscribers of an exchange having a selector modified in the manner of Figure 11 to restrict access to two of the selector levels. Subscribers of a preferred class in this arrangement (class four) may be provided with access to more than one of the restricted levels. In addition to providing a more flexible type exchange in a comparatively economical manner, an extremely tamper-proof arrangement is made possible.

*Access to a plurality of trunks responsive to transmission of one impulse*

In the embodiment set forth in Figure 12 a plurality of levels are restricted for special service use, and the subscribers are divided into two classes, those having access to the entire set of restricted levels and those not having access to any of the restricted levels. For purposes of illustration levels seven, eight, and nine are shown as the restricted levels, but any group of levels may obviously be set aside for such use.

Subscribers of the class having access to special service trunks will have a cam member, such as 900, having a projection such as 903, located at the point indicated by peripheral numeral 7 (Figure 9). The subscribers of the other class who are not entitled to have access to the restricted trunks will have conventional type dials.

Assuming a party having access to the restricted special service levels dials the digit 7, 8, or 9, selector line relays 430 and 435 will respond to the first six incoming impulses to advance the chain to the sixth counting chain relay 645. As the open period of the seventh pulse is being transmitted, the pulse defining springs 210a and 210b will effect the application of ground to the negative side of the line over a circuit prepared by special service springs 214 and 215 and projection 903, and relay 430 responsively energizes while line relay 435 releases.

Accordingly, a circuit is completed to the special service relay 1290 over the closed contacts 645 of the sixth counting chain relay, the circuit extending from battery over contacts 451, the winding of relay 1290, contacts 1288, contacts 648a, conductor 403, and contacts 432 and 437 to ground. Special service relay 1290 operates and at its contacts 1291 locks to ground over selector link conductor 317, at its contacts 1292, 1294 and 1296 prepares operating circuits for the selector relays S7000, S8000, S9000, respectively, and at its contacts 1293, 1295, and 1297 opens a point in the operating circuit for the signalling relay 475. As the remaining impulses are received the counting chain advances to the relay which corresponds to the particular number which has been dialled, that is the seventh, eighth or ninth relay.

Transfer relay 455 restores following receipt of the digit and at its contacts 457 and 458 completes an operating circuit for the selector relay associated with the particular counting chain relay which is operated, that is, if digit 7 has been transmitted, the seventh counting chain relay 650 will be operated, and an operating circuit for the selector relay S7000 is completed. Similarly, if digit 8 has been dialled, the eighth counting chain relay 655 would be operated and a circuit for selector relay S8000 would be completed over contacts 658. If digit 9 is dialled a circuit is completed to selector relay S9000 over closed contacts 663 of the ninth counting chain relay 660.

In the event that a subscriber of the restricted class having a conventional dial registers the digit 7, 8, or 9 for transmission, the counting chain advances to the particular relay which corresponds to the digit registered. Special service relay 1290 will remain inoperative, however, in that a special service impulse is not transmitted. Upon completion of receipt of the digit, the transfer relay 455 will restore to instead complete a circuit over the operated one of the counting chain relays to the signalling relay 475. Specifically, relay 475 will operate over a circuit extending from battery over the winding of relays 475, contacts 1293 or 1295 or 1297, contacts 653, 658 or 663, and contacts 457 or 458 to ground. Signalling relay 475 operates to transmit busy tone over the line to indicate to the subscriber that a restricted level has been approached. The equipment restores with the subsequent restoration of the equipment at the subscriber substation.

Protection against fraudulent operation by unscrupulous subscribers is again effected by the provision of a fraudulent control relay 1287 which is arranged in the manner heretofore described to be controlled by a series of parallel circuits extending over the counting chain relays not associated with a restricted level. Thus in the event of the application of ground potential to the negative side of the line by an unscrupulous subscriber during the open period of any pulse prior to the restricted level which is sought, the particular counting chain relay which is operated at that time will effect the extension of the calling line to the fraudulent control relay 1287. Specifically as one side of the line is grounded during a break period, line relay 430 operates and line relay 435 releases and a circuit extending from battery over the winding of fraud control relay 1287, conductor 415, the closed contacts of the operated one of the counting chain relays, conductor 403, and contacts 432, 437 to ground is completed. Fraudulent control relay 1287 operates and at its contacts 1288 opens the operating circuit to the special service relay 1290 to prevent the operation thereof as the chain reaches the restricted level. Fraudulent control relay 1287 is also operative in the manner heretofore described to extend busy tone to the subscriber to indicate to the party that his fraudulent attempt to complete a connection to a restricted special service level has failed.

It is apparent from the foregoing that access to a number of restricted special service levels may be selectively provided for a given class of subscribers through the means of a single cam member and the transmission of a single special service identification pulse to a selector modified in the manner shown in Figure 12.

*Screening through means of a plurality of special service pulses*

Figure 13:
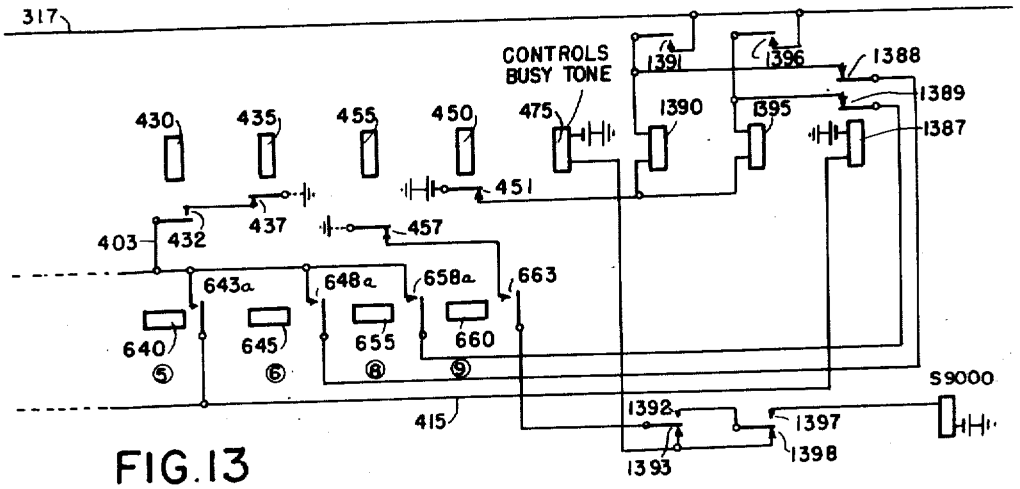

In the interests of added security against fraudulent operation, it may be desirable to provide an arrangement in which access to restricted selected levels is attained only by the transmission of two special pulses at two different predetermined time periods both of which are momentary and contemporaneous with the transmission of the selector operating digits, and it is such arrangement that is set forth in the embodiment shown in Figure 13. Fraudulent attempts to gain access to a restricted special service level (indicated herein as level 9) would require the momentary simulation of a special pulse only during the open periods of the seventh and ninth selector operating pulses. The chances of simulating dual special impulses at precise time intervals is extremely difficult and an extremely fool proof system is effected.

Subscribers of the class having access to the ninth level will be provided with a special cam member such as 900 (Figure 9), having a pair of cam extensions, such as 903, one of which is located at the point indicated by peripheral numeral 7 and the other of which is located at the point indicated by peripheral numeral 9. Thus as the digit 9 is transmitted by a subscriber having said dial, as the open periods of the seventh and ninth impulses are transmitted, pulse defining springs 210a and 210b, special service springs 214 and 215 and both cam projections will cooperate to apply ground potential to one side of the line. Line relay 430 and line relay 435 are thus operated twice in opposition during the transmission of the digit 9.

Specifically, in the transmission of the digit 9 by a party of this class, line relays 430 and 435 will operate responsive thereto to advance the counting chain to the ninth relay 660. As the first special pulse is transmitted during the break period of the seventh impulse line relay 430 will operate and line relay 435 will restore and a circuit will be completed for the first special service relay 1390 extending from battery over contacts 451, over the winding of relay 1390, contacts 1388, contacts 648a, of the sixth counting chain relay 645 (which is operated at this time), conductor 403, and contacts 432 and 437 to ground.

Special service relay 1390 operates and at its contacts 1391 completes a self-holding circuit to the selector link ground over conductor 317, at its contacts 1392 prepares a point in the circuit for selector relay S9000, and at its contacts 1393 opens a point in the circuit for the signal relay 475.

As the second special impulse is transmitted during the break period of the ninth impulse a circuit will be completed for the second special service relay 1395 which extends from battery over contacts 451, the winding of special service relay 1395, contacts 1389, contacts 658a (of the eighth counting chain relay 655 which is operated at this time) conductor 403, and contacts 432, 437 to ground.

Special service relay 1395 operates, and at its contacts 1396 locks to link selector ground over conductor 317, at its contacts 1397 prepares a further point in the circuit to the selector trunk relay S9000, and at its contacts 1398 opens a further point in the operating circuit for the signalling relay 475. As the counting chain relay 660 now operates, it is effective at its contacts 663 to prepare a further point in the circuit for the selector trunk relay S9000.

Transfer relay 455 releases following receipt of the ninth impulse and is effective at its contacts 457 to complete the energizing circuit for the selector relay S9000, the circuit extending from battery over the winding of relay S9000, contacts 1397, 1392, 663 and 457 to ground. The extension of the subscriber to the special service facilities associated with the ninth level is now effected in the manner heretofore described.

It is seen therefrom that the transmission of two special service impulses during a predetermined period, that is, the open periods of the seventh and ninth impulses, is required to effect the operation of the selector relay, such as S9000, for the restricted level. It is apparent that a different number of impulses may be required and different operating periods may be used to effect a similar type arrangement for other levels.

In the event that a party of the class which is not entitled to have access to the special service facilities should dial digit 9, the counting chain will advance to the ninth counting chain relay 660 in the conventional manner. Since no special pulse is transmitted the special service relays 1390 and 1395 will be restored and as the transfer relay 455 releases, it will be effective at its contacts 457 to complete an operating circuit to the signalling relay 475, the circuit extending from battery over the winding of relay 475, contacts 1393, contacts 663, and contacts 457 to ground. Signal relay 475 operates to transmit busy tone to the subscriber to indicate to that party that a restricted level has been approached.

Fraud control is again provided by means of a special fraud control relay 1387 which is arranged to be controlled by a series of parallel circuits extending over the contacts of the first five counting chain relays. In the event that a ground impulse is effected on the proper line conductor during the open period of any one of the first five impulses a circuit will be completed to the fraud control relay to effect the operation of the fraud control relay 1387 whereby the special service relays 1390 and 1395 are rendered inaccessible for the duration of the connection.

For example, should a special pulse be simulated during the break portion of the fifth impulse, fraud control relay 1387 will then operate over a circuit extending from battery over the winding of relay 1387, contacts 643a, C403, contacts 432 and 437 to ground. Fraud control relay 1387 at its contacts 1388 and 1389 opens a circuit to the special service relays 1390 and 1395 to prevent the operation thereof and is effective in the manner heretofore described to signal the subscriber that his attempt to seize the restricted level has failed.

Should a subscriber successfully simulate the transmission of the seventh regular pulse, it is apparent that the first special service relay 1390 will operate and at its contacts 1392 prepare the circuit to the selector relay S9000. The party, however, must also successfully simulate the ninth impulse or the second special service relay 1395 will remain inoperative. Accordingly, as the transfer relay 455 subsequently restores it is effective at its contacts 457 to complete an operating circuit to the signal relay 475 from battery over the winding of relay 475, contacts 1398, and contacts 1392, 663, and 457 to ground.

Similarly, if the special service impulse is successfully simulated during the break period of the ninth impulse, but not during the break period of the seventh impulse, special service relay 1390 is inoperative whereupon the circuit to the selector relay S9000 is interrupted at contacts 1392 and the signalling relay 475 is operated over a circuit extending from battery over the winding of relay 475, and contacts 1393, 663 and 457 to ground.

SUMMARY

The several new and novel circuit arrangements disclosed herein are each especially adapted to solve the problems normally inherent in the provision of preferred service to certain subscribers in exchange layouts. Such arrangements are made feasible primarily by the provision of a novel subscriber control circuit which because of its flexible nature is adapted to afford any number of special control operations. It is particularly important to note that the diversity of control is achieved through an inexpensive modification of conventional equipment and accordingly the extensive use thereof in new, as well as established, exchange installations is practical and desirable. The improved type of preferred service results from the new and novel selector circuits which are arranged to reliably respond to brief momentary special signals transmitted over said control circuit concurrently with the regular operating pulses to simultaneously effect a selecting and discriminating control operation. In addition to providing a selector which effects extremely difficult control operations in a reliable and dependable manner, it is important to note that the structure required for effecting such desirable type control is economical in manufacture and, therefore, generally tends to promote the advance of the telephone art. Finally, the novel fraud control means, which go hand-in-hand with the novel basic control circuit and selector switches, effects an arrangement which is especially appealing to the operating companies.

The novel control and selector circuits because of these economical and dependable features lend themselves to extensive use in accomplishing many other types of special service arrangements and should not be limited in scope to the particular embodiment disclosed. Various other features of the invention which are believed to be new are set forth in the accompanying claims.

I claim:

1. In a telephone exchange which terminates a plurality of subscriber lines, special service equipment connected for use by predetermined ones of said subscriber lines, a plurality of links having access to said lines and said special service equipment, signalling apparatus individual to each of said lines for controlling said links in setting up said connections, means at each of said predetermined preferred lines associated with said signalling apparatus for effecting the concurrent transmission to said links of operating signals comprised of make and break impulses, and identification signals comprised of a ground impulse synchronized with a predetermined one of said break impulses, and connecting means in said link for connecting said calling line to said special service equipment operated responsive to receipt of a digit comprising a predetermined number of said make-break operating impulse signals, and the concurrent receipt of identification impulse synchronized with a predetermined one of said operating signals; said connecting means comprising a pair of discriminating line relays, a relay counting chain, means for connecting said line relays to operate in a first manner responsive to receipt of said operating signals, means controlled by said line relays in said first operation for effecting advancement of said chain, means controlled by advancement of said chain to a predetermined point to prepare for seizure of said special service equipment, means connecting said line relays to operate in a second manner responsive to receipt of said identification impulse concurrently with said operating impulses, and means controlled by said line relays with operation thereof in said second manner to effect the completion of the connection to said special service equipment over said selected circuit.

2. In a telephone exchange, a plurality of subscribers' lines and a plurality of restricted trunk lines connected for use by only predetermined ones of said subscribers' lines, a plurality of links for setting up connections from calling lines to other subscribers' lines and said restricted trunk lines, signalling apparatus for each of said preferred subscribers' lines including impulsing means for transmitting a first set of impulses, and auxiliary control means connected with the apparatus at the predetermined lines for transmitting an identification impulse set synchronized with only a predetermined portion of said first signal set, the number of identification impulses being less than the impulses of said first set, and means in said links operative only with receipt of said identification impulse set concurrently and in synchronism with the predetermined portion of the first impulse set to set up a connection between the calling one of said lines and an idle one of said trunk lines.

3. In a telephone exchange which terminates a plurality of lines, special service equipment connected for use by certain of said lines, a plurality of links for, at times, setting up connections between a calling and a called one of said lines, and for, at other times, setting up connections between one of said certain calling lines and said special service equipment, each of said links including a special service control relay for preparing for connection of said calling line to said special service equipment; control apparatus associated with each of said subscribers' lines having access to said special service equipment for concurrently transmitting a first and a second predetermined signal set, at least a portion of which are in synchronized relation with each other; and means in said link equipment which is operative only responsive to receipt of a first impulse set of a predetermined number of impulses from a calling line to prepare an operating circuit for said special service control relay, and operative responsive only to concurrent receipt of at least one impulse synchronized with a preassigned impulse of said first signal set to operate said special service control relay as prepared for operation by said first signal set.

4. In a telephone system having special service equipment for performing special operating functions, a plurality of subscribers' lines, certain of which have more than one substation connected thereto, said subscriber's substations being divided into two classes, one of said classes being entitled to unrestricted use of said special service equipment, the other of said classes being totally restricted from use of said special service equipment, certain of said lines having only said one class of subscriber substations connected thereto, others of said lines having said one and said other class of subscriber substations connected thereto; a plurality of links connected for use by said plurality of subscribers' lines in establishing connections between subscribers' lines, seizing means in said links operative to seize said special service equipment, control means including a special service relay for preparing an operating circuit to said seizing means for said special service equipment, signalling apparatus associated with the substations of said one class of subscribers for concurrently sending two sets of signals, the impulses of one set being concurrent only with a portion of the second impulse set, and means in said links operative to complete an energizing circuit to said special service relay only responsive to concurrent receipt of the first impulse set with the preassigned portion of said second impulse set.

5. In a telephone system having a plurality of trunk lines and a plurality of subscribers' lines each of which subscribers' lines has at least one substation connected thereto, certain of said subscribers' substations being arranged to have unrestricted access to said trunk lines, a plurality of links each including a finder and a selector switch having access to said subscriber's line and said trunk lines, each of said substations including signalling means for sending operating signals to control said links to establish a connection over a selected circuit to desired ones of said subscribers' lines, said certain substations having access to said trunk means including signalling means for concurrently transmitting a predetermined operating signal to select one of said trunk lines and an identifying signal to indicate the preferred character of that line, discriminating relay means in said selector operated responsive only to concurrent receipt of said predetermined operating and said predetermined identifying signal to connect the calling subscriber station with an idle one of said trunk lines, detector means in said selector operative responsive to receipt of said predetermined operating signal without said identifying signal to terminate extension of the connection, and means operative with termination of the extension of the connection to transmit a signal to the calling subscriber to indicate call termination to such subscriber.

6. In a telephone exchange which terminates in a plurality of subscribers' lines, special service equipment connected for use by only certain predetermined ones of said subscribers' lines, a plurality of links for setting up connections between said lines, signalling apparatus for each of said lines for sending a set of operating signals to control said links to establish connections between said lines, auxiliary means associated with the signalling apparatus for the certain predetermined ones of said lines operative to send concurrently an identifying signal comprising at least one impulse which is synchronized with at least one impulse of said operating signal; operating means in said links for responding to said incoming signals comprising an incoming circuit, a pair of line relays, each of which have a first and second operating position, means for connecting said relays in combination to said incoming circuit, means for rendering said relays operative to like positions with the receipt of each operating signal of said first set and operative to different positions with receipt of said concurrent identifying signal; call extension means operative to connect the calling line to the special service equipment, and control relay means controlled by said relays as operated to said different positions to energize said call extension means.

7. In a telephone exchange which includes a plurality of subscriber's lines, each having at least one substation connected thereto; special service equipment connected for use by predetermined ones of said subscribers' lines, and a plurality of links for extending calls between said substations, predetermined ones of said substations being arranged to have unrestricted use of said special service equipment in said exchange, said predetermined substations having impulsing means, and special impulse means individual thereto for transmitting a first and a second impulse set concurrently to extend the call over a seized link to said special service equipment, impulse responsive means in said links comprising a set of counting chain relays and a set of series operated line relays, means for connecting said line relays to operate in a first manner responsive to receipt of one of said sets of signals, means controlled by said relays with receipt of said first impulse set to advance said counting chain in a given sequence to a corresponding relay, selector means for said special service equipment, an energizing circuit therefor, means controlled by at least one of the chain relays as operated to complete a portion of said energizing circuit for said selector means as the chain advances to said one relay; means connecting said line relays to operate in a second manner responsive to receipt of said first and second signal sets concurrently, and means controlled by said relays in said second manner of operation of said line relays to complete a further control point in the operating circuit for said selector means.

8. In a telephone exchange which terminates a plurality of subscriber's lines, special service equipment connected for use by predetermined ones of said subscribers' lines, a plurality of links for connecting calling lines to called lines and said special service equipment, apparatus individual to each of said lines for controlling said links in setting up said connections, means at each of said predetermined lines associated with said apparatus thereat for effecting the concurrent transmission to said links of operating signals and identification signals, and circuit extension means in said link operated responsive to concurrent receipt of a digit comprising an operating signal of a predetermined number of impulses and an identification signal synchronized with a predetermined portion of said operating signal to connect said calling line to the special service equipment designated thereby, said circuit extension means comprising a relay counting chain, a pair of discriminating line relays, means for connecting said line relays to operate in a first given manner responsive to receipt of said operating signals, means controlled by said line relays in their first operation to sequentially advance said counting chain to the indicated one of the relays, selector equipment for effecting connection of the calling one of said lines to said special service equipment, a control relay for preparing a circuit to said selector equipment, means controlled responsive to operation of one of said counting chain relays to control a point in an energizing circuit for said control relay; means connecting said line relay for operation in a second manner responsive to receipt thereby of said predetermined identifying signal with said operating signals, and means controlled by said line relays in said second manner of operation to energize said control relay; supervisory means in said link operated responsive to receipt of said identification signal at a time interval other than said predetermined interval to prevent operation of said control relay, said supervisory means comprising a guard relay connected to control a point in the operating circuit for said control relay, and a plurality of parallel operating circuits for said guard relay controlled by said line relays and individual ones of the counting chain relays other than said one counting chain relay; means operated by said line relays as operated in said second manner responsive to receipt of an identification signal during the period of operation of one of said counting chain relays other than said one relay to complete an operating circuit for said guard relay, and means controlled by said guard relay in its operation to open the operating circuit to said control relay.

9. In a telephone exchange which terminates a plurality of subscribers' lines, special service equipment connected for use by predetermined ones of said subscribers' lines, a plurality of links having access to said lines and said special service equipment, apparatus individual to each of said lines for controlling said links in setting up said connections, means at each of said predetermined lines associated with said apparatus for effecting the transmission of operating signals and identifying signals concurrently to said links, and circuit extension means in said links operated responsive to concurrent receipt of a digit comprising an operating signal of a predetermined number of impulses and an identification signal timed with a predetermined one of the operating impulses for controlling connections of said calling line to said special service equipment, said circuit extension means comprising a relay counting chain, a pair of discriminating line relays, means connecting said line relays to operate in a first manner responsive to receipt of said operating signals, means controlled by said line relays in said operation to advance said counting chain relays in accordance with the number of operating signals received, selector equipment for effecting connection of the calling one of said lines to said special service equipment, a control relay for preparing an energizing circuit to said selector equipment, means including said line relays and one of said counting chain relays to complete an energizing circuit for said control relay responsive to receipt of all but the last of the operating impulses of the incoming set, and means including said line relays operative to control another of said counting chain relays and said control relay responsive to receipt of said last operating impulse concurrently with said identifying signal to further prepare said operating circuit to said selector equipment.

10. In a telephone exchange which terminates a plurality of subscribers' lines, predetermined ones of which are arranged for use with special service equipment associated in the exchange; a plurality of links connected for use by said plurality of lines in setting up connections between said lines, apparatus individual to each of said lines for selectively controlling said links in setting up connections between said lines, said line apparatus comprising a dial having a normal position and being variably rotatable away therefrom to a plurality of other positions, an off-normal cam for preparing an impulsing circuit with each movement of the dial from its normal position, and a set of impulse springs operated with release of the dial to intermittently interrupt said prepared circuit a number of times which is determined by the position to which the dial is moved to register a digit, and auxiliary control means for each of the predetermined lines in said exchange operative to transmit, concurrently and in synchronized relation with predetermined impulses of said first impulse set, a second set of information-designating impulses, said auxiliary control means comprising a pair of special impulse springs controlled to operate by said off-normal cam only with each restoring movement of the dial and means in said links operative to set up connections between said predetermined subscribers' lines and said special service equipment only with receipt of said concurrent synchronized impulses.

11. In a telephone system which terminates a plurality of subscriber lines and includes special service equipment, a plurality of links connected for use by said subscriber lines, special apparatus individual to at least one of said subscriber lines for transmitting signals to control said associated links to set up connections between said lines and said special service equipment, said line apparatus comprising a variably rotatable dial, a pair of impulse springs, means including a cam member operative with each rotation of said dial to effect generation of a number of operating impulses consistent with the relative movement of the dial, means including a pair of special impulse springs operative during the transmission of each set of operating impulses to prepare a circuit for transmission of said special impulses, and a third spring associated with said first pair of springs controlled by said cam member in each operation of said dial to complete said circuit at predetermined times to effect transmission of at least one special impulse synchronized with a predetermined one of said operating impulses.

12. In a telephone exchange, a plurality of subscribers lines, and a plurality of special service lines connected to special service equipment; a plurality of links for selectively extending the subscriber lines to said special service equipment and other subscriber lines, apparatus individual to each of said subscribers lines for transmitting a first impulse set to selectively control said links to prepare a selection circuit to the desired line, and auxiliary control means associated with each of the predetermined lines in said exchange operative with said first apparatus to transmit contemporaneously a second set of information-designating impulses which are keyed to the impulses of said first set according to a code wherein information is conveyed by different positions of the impulses of the second set relative to the impulses of the first set, independent of the numerical number of the second impulses; and means in said links operative to connect the calling line to a special service line indicated by said first impulse set only responsive to concurrent receipt of the impulses of the second set in the preassigned positions relative to the impulses of the first set.

13. In a telephone exchange, a plurality of subscribers' lines, special service equipment connected for use with predetermined ones of said subscribers, a plurality of finder-selector switch links for setting up connections from a calling line to other lines and to said special service equipment, signalling apparatus for each of said lines including means for transmitting a first set of impulses, auxiliary control means connected with said signalling apparatus at said predetermined ones of said subscribers' lines to transmit contemporaneously and in synchronized relation with impulses of said first set, a plurality of information-designating impulses less in number than said first set and having the same electrical characteristics as the impulses of said first set, and call extension means in said finder-selector switch links operative only responsive to contemporaneous receipt of said first and second sets of information-designating impulses in said synchronized relation to connect the calling one of said predetermined lines over said finder and selector switches to said special service equipment.

14. In a telephone exchange, a plurality of subscribers' lines, special service equipment connected for use by predetermined ones of said subscribers' lines, a plurality of links each of which includes at least a selector switch, a predetermined number of line groups connected for selection by said selector switch comprising at least one group of said subscribers' lines and at least one group of lines extending to special service equipment, signalling apparatus at each of said subscribers lines operable to transmit a first impulse set to said links to control same to selectively extend the connection to the line group indicated by the number of impulses in said set, auxiliary impulsing means associated with said predetermined lines operative to contemporaneously transmit a second set of information designating impulses less in number than said first set and having the same electrical characteristics and duration as the impulses of said first set; means in each link selector switch operative in response to receipt of said first set of impulses to prepare a selection circuit for the indicated one of said groups, and means operative with receipt of a first impulse set indicating a special service equipment line group to connect the calling one of said lines over sad selector switch tothe special service group only responsive to receipt of said second impulse set contemporaneously with said first impulse set.

15. In a telephone exchange, a plurality of trunk lines divided into groups and a plurality of subscribers' lines divided into groups, a plurality of finder-selector switch links, line selecting means in each of the link selector switches including a relay counting chain for selecting and controlling extension of calling lines to desired groups of said trunk and subscribers' lines; signalling apparatus for each of said subscribers' lines for transmitting a first impulse set to indicate the desired line group, special control apparatus at predetermined ones of said subscriber lines operative with the signalling apparatus thereat, to transmit concurrently a second set of information designating impulses, and means in said link operative to advance said counting chain to prepare a selection circuit for the line group indicated by the first impulse set, and means including said counting chain operative to complete the selection circuit as prepared to a trunk line group only responsive to the concurrent receipt of the second impulse set transmitted by said special control apparatus.

16. In a telephone exchange, a plurality of subscribers' lines, predetermined ones of which are arranged for unrestricted use with special service equipment in the exchange, a plurality of links for connecting calling lines to called lines and to said special service equipment, apparatus individual to each of said lines for transmitting a set of operating impulses to control said links in setting up said connections, means at each of said predetermined lines connected with said apparatus to effect the transmission of an identifying signal to said links concurrently with the impulses of said first set, control means in said link operated only responsive to receipt of a predetermined number of operating impulses and the receipt of a predetermined identification signal only during the receipt of a predetermined one of said operating impulses, call extension means operatively controlled responsive to operation of said control means to connect said calling line to said special service equipment, supervisory means in said link operated responsive to receipt of said identification signal at a time interval other than the predetermined interval, and means controlled responsive to operation of said supervisory means to prevent operation of said call extension means and to transmit a signal to the subscriber to indicate the termination of the extension of the call.

17. In a telephone exchange, a plurality of subscribers' lines, special service equipment connected for use only by predetermined ones of said lines, a plurality of links for connecting calling lines to called lines and to said special service equipment, apparatus individual to each of said lines for controlling said links in setting up said connections, means at each of said predetermined lines associated with said apparatus for effecting the transmission of operating signals and identifying signals concurrently to said links, and circuit extension means in said link operated responsive to concurrent receipt of a digit comprised of an operating signal of a predetermined number of impulses and a predetermined timed identification signal, to connect said calling line to said special service equipment, said circuit extension means comprising a relay counting chain, a pair of discriminating line relays, means for connecting said relays to operate in a first manner responsive to receipt of said operating signals, means operatively controlled by said line relays in such operation to advance said counting chain relays in accordance with the number of operating signals received; a selector relay for effecting connection of the calling one of said lines to said special service equipment, a control relay for preparing a circuit to said selector relay, means controlled by one of said counting chain relays to control a point in an energizing circuit for said control relay responsive to receipt of said predetermined operating signal, means operative to connect said line relays to operate in a second manner only responsive to receipt thereby of said predetermined identifying signal at a predetermined interval during the receipt of said operating impulses, and means controlled by said line relays as operated in said second manner to prepare a point in said operating circuit for said selector relay.

18. In a telephone exchange which terminates a plurality of subscribers' lines, special service equipment connected for use by only certain predetermined ones of the subscribers lines, a plurality of links for setting up connections between said subscribers' lines, signalling apparatus for each of said lines for controlling said links to extend calls to said lines, auxiliary means connected with the signalling apparatus for the predetermined ones of said lines to effect the sending, in a single operation of said signalling apparatus, of a set of operating signals, and a plurality of identification signals which are synchronized with only predetermined portions of said operating signal set; signal responsive means in said links including call extension means operative to connect the calling line over said link into said special service equipment, a plurality of special service control relays connected to prepare an operating circuit for said call extension means only responsive to operation of said special service control relays in combination, and means for operating said special service control relays in said combination only responsive to the receipt of the plurality of identification signals in synchronized relation with said predetermined portion of said operating signal set.

19. In a telephone exchange, a plurality of subscribers' lines, special service equipment connected for use by only predetermined ones of said subscriber lines, a plurality of links for setting up connections between said subscribers lines, and impulsing apparatus individual to each of said lines for selectively controlling said links in setting up connections between said lines, said impulsing apparatus comprising a dial having a normal position and being variably rotatable away therefrom to a plurality of other positions, an off-normal cam for preparing an impulse circuit as the dial is moved from its normal position, and a set of impulse springs for sending a first set of impulses by intermittently interrupting said prepared circuit a number of times which is determined by the position to which the dial is moved to register a digit, and auxiliary control means connected with the impulsing apparatus for each of the predetermined lines in said exchange to send a second set of impulses concurrently with said first set of impulses, comprising a pair of special impulse springs, a cam member having a normal position and arranged to be moved therefrom with each movement of the dial off-normal and restored to its normal position with each restoration of the dial, and a plurality of projections on said cam member for operating said special impulse springs concurrently with the transmission of each first impulse set by said dial to connect ground to one side of the line a number of times consistent with the number of cam projections thereon, and means operative responsive only to receipt of said concurrent timed impulses to extend connections by way of said links between said predetermined subscriber lines and said special service equipment.

20. In a telephone exchange, a plurality of subscribers' lines, special service equipment connected for use by only predetermined ones of the subscriber lines; a plurality of links for setting up connections between said lines, impulsing apparatus individual to each of said lines for selectively controlling said links in setting up connections between said lines, said impulsing apparatus comprising a dial having a normal position and being variably rotatable away therefrom to a plurality of other positions, an off-normal cam for preparing an impulse circuit as the dial is moved from its normal position, and a pair of impulse springs for intermittently interrupting said prepared circuit a number of times to effect transmission of a number of make-break impulses which is determined by the position to which the dial is moved to register a digit, and auxiliary control means associated with each of the predetermined lines in said exchange for effecting the transmission of a second set of impulses concurrently with said first set of impulses comprising a third spring associated with said first pair of springs, a pair of special impulse springs, a cam member having a normal position and arranged to be moved therefrom with each movement of the dial off-normal and restored to its normal position with each restoration of the dial, a plurality of projections on said cam member for operating said special impulse springs to prepare connection of ground to one side of the line contemporaneously with the transmission of a predetermined number of make and break impulses, means including said third spring operative to complete said line ground connection during the open period of only a portion of the total number of said predetermined impulses.

21. In a supervisory control arrangement having switching equipment, a plurality of circuit paths connected for selection by said switching equipment, a plurality of control points, each having means for selectively operating said switching equipment to connect the initiating one of the points in a selective manner to a desired one of said circuit paths, means in said switches for connecting certain of said circuit paths for use by only predetermined ones of said control points, an impulse transmitting unit for each of said predetermined ones of said control points for transmitting concurrently a set of path selecting impulses and a set of path connecting impulses, the path connecting impulses for the different paths being keyed to different ones of said path selecting impulses, selection means for each path operative to connect the path to a calling line, means in said switching equipment for counting the incoming impulses and preparing a circuit to the selection means for the path indicated by the number of circuit path selecting impulses transmitted, and connecting means operative to complete the prepared selection circuit only responsive to the receipt of the connecting impulse set keyed to the preassigned ones of the selecting impulses for such path.

22. In a telephone exchange, a plurality of subscribers' lines and a plurality of special service facilities connected for use by only preferred ones of said subscribers lines, switching equipment in said exchange, impulse transmitting means associated with each of the preferred subscribers lines for transmitting selecting impulses to said switching equipment to control the connection of a subscriber line to a special service facility, including auxiliary impulse transmitting means for transmitting a single connecting impulse synchronized with only a predetermined one of said selecting impulses, the selecting impulse with which said connecting impulse is synchronized by the impulse transmitting means being different for different special service facilities, and call extending means in said switching equipment for extending the calling line to a special service facility only responsive to the receipt of the proper number of selecting impulses and the connecting impulse keyed to the proper one of the impulses of the selecting impulse set.

23. An arrangement as set forth in claim 22 in which said exchange includes means in said call extending means for transmitting a busy tone signal to a subscriber other than a preferred subscriber responsive to an attempt by such subscriber to seize any one of said special service facilities by transmitting the assigned number of selection pulses.

24. In a telephone exchange, a plurality of subscribers' lines, a plurality of special service facilities connected for use by only preferred ones of said subscribers lines, means for connecting different ones of said preferred subscribers to different ones of said facilities, and for connecting certain of said subscribers to more than one of said special service facilities, including switching means in said exchange, impulse transmitting means associated with each of said subscribers lines for transmitting selecting impulses to said switching equipment to control the extension of a call thereover, auxiliary impulse transmitting means for each subscriber of said preferred class operative to transmit an identification impulse synchronized with only a predetermined one of said selecting impulses, the selecting impulses to which the identification impulse is synchronized being different for preferred subscribers which are arranged to be connected to different ones of said special service equipments, and means in said switching equipment operative to connect the calling line to the special service facility indicated by the number of selecting impulses transmitted only responsive to the receipt of the identification impulses in the synchronized relation with the proper one of the selecting impulses for the special service facility desired.

25. In a telephone exchange which terminates a plurality of subscribers lines and which includes a plurality of restricted special service facilities, a plurality of classes of subscribers comprising a first class of subscribers which is restricted from connection to any of said plurality of special services, and a second class of preferred subscribers, which is arranged to be connected to all of said restricted special service facilities, impulse transmitting means for each of the preferred subscriber substations for transmitting concurrently a set of special service selecting impulses and a unit operating impulse, including means for synchronizing the unit operating impulse with a predetermined one of said selecting impulses according to a predetermined code in which the unit operating impulse is synchronized to a different selecting impulse for the different special service facility impulse selecting sets, means in said exchange operative to prepare a selection circuit for the special service facility indicated by the number of selecting impulses transmitted, control means in said exchange operated responsive only to receipt of said unit operating impulse in synchronized relation with its assigned selecting pulse, means operatively controlled by said control means to prepare a further point in the selection circuit for the indicated special service facility, and means operative to select said special service facility responsive to termination of transmission of the concurrent impulse set.

26. A selector switch for use in an automatic telephony exchange, a plurality of levels in said switch for effecting selective connection with associated groups of subscriber lines, means for connecting certain of said levels for restricted use and other of said levels for nonrestricted use, impulse responsive means for receiving a first set of incoming selective impulses and for preparing a selection circuit for a level in accordance with the number of selective impulses in said set, discriminating means operative to detect receipt of a second impulse set concurrently with said first impulse set, and circuit extending means operative to complete the selection circuit for a restricted level thereafter only responsive to receipt by said discriminating means of an identification impulse concurrently with and in synchronized relation with only a predetermined one of said impulses in said selective impulse set.

27. A selector switch for use in an automatic telephony exchange, a plurality of selective levels in said switch for effecting selective connection with individual groups of subscriber lines, means for connecting certain of said levels for restricted use and others of said levels for unrestricted selection by the selector, impulse responsive means for receiving at least one set of incoming selective impulses and preparing a selection circuit for the level indicated by the number of selective impulses in said set, discriminating means operative to detect receipt of a second impulse set concurrently with the one set, and circuit extending means operated thereafter to complete the selection circuit as prepared to a restricted level only responsive to receipt by said discriminating means of an operating impulse in synchronized relation with only a predetermined one of said incoming selective impulses, including means connected to complete the selection circuits to the different restricted levels only with receipt of an operating impulse synchronized with a correspondingly different one of the selective impulses.

28. In a selector switch for use in an automatic telephony exchange, a plurality of selective levels in said switch for effecting selective connections with individual groups of subscribers lines, means for connecting certain of said levels for restricted use and others of said levels for unrestricted use, impulse responsive means for receiving a first set of incoming selective impulses and for preparing a selection circuit for the level indicated by the number of impulses in the selective impulse set, discriminating means for detecting receipt of a second impulse set concurrently with said first impulse set, and circuit extending means operative to seize a restricted level over a selection circuit prepared thereto only responsive to receipt by said discriminating means of an identification impulse in synchronized relation with a predetermined one of said incoming selective impulses, including means for completing the prepared circuit for different restricted levels only with receipt of an identification impulse synchronized with a correspondingly different one of the impulses of the selective impulse set assigned thereto, and means operative to prevent seizure of said selected restricted level responsive to the receipt of an identification impulse at an interval in addition to the one received at its assigned interval.

29. A selector switch for use in an automatic telephone exchange, a plurality of selective levels in said switches for effecting connection with individually assigned groups of subscriber lines, means for restricting certain of said subscribers from connection with certain of said levels, each restricted level having an access code comprised of a predetermined number of selective impulses and an identification impulse transmitted concurrently with a predetermined one of the impulses in the selective impulse set, including impulse responsive means for receiving a series of incoming selective impulses and for preparing a selection circuit for the level indicated by the number of selective impulses received, discriminating means operative to detect the receipt of an identification impulse concurrently with the selective impulses, and means operative to complete the selection circuit to a restricted level as selected only responsive to receipt by said discriminating of the identification impulse concurrently with and synchronized with its preassigned one of the incoming selective impulses for such level.

30. A selector switch for use in an automatic telephony exchange, a plurality of levels in said switch for effecting connection with individual groups of subscriber lines, means for restricting certain incoming calls from connection over a plurality of said levels including impulse responsive means for receiving a series of incoming selective impulses and for preparing a selection circuit to the level indicated by the number of selective impulses received, discriminating means operative with receipt of an operating impulse set concurrently with said selective impulse set, circuit preparing means operatively controlled thereby to prepare an operating circuit to all of the restricted levels only responsive to receipt by said discriminating means of an operating impulse concurrently with and in synchronized relation with only a predetermined one of said level selecting impulses, and circuit extending means operative to complete the selection circuit prepared to a level responsive to termination of receipt of the concurrent impulse set.

31. A selector switch for use in an automatic telephony exchange, a plurality of levels in said switch for effecting connection with associated individual groups of subscriber lines, means for restricting certain subscribers from use of at least one of said levels including impulse responsive means for receiving a set of incoming selective impulses and for preparing a selection circuit for the level indicated by the number of selective impulses in said set, discriminating means operative with receipt of a set of identification impulses concurrently with the selective impulses, and means operative thereafter to complete a selection circuit as prepared to a restricted level only responsive to receipt by said discriminating means of a plurality of identification impulses concurrently with and synchronized with only a predetermined portion of said set of incoming selective impulses.

32. In a telephone exchange, a plurality of subscriber lines, a plurality of special service facilities connected for use by only preferred ones of said subscriber lines, a plurality of links for setting up connections from calling subscriber lines to other subscriber lines and said special service facilities, signalling apparatus for each of said preferred subscriber lines including impulsing means for transmitting a first set of selection impulses, auxiliary control means connected with the signalling apparatus at the preferred lines for transmitting an identification impulse set comprised of a number of identification impulses less in number than the selection impulses and synchronized with only a predetermined portion of the selective signal set, and means in said links operative only with receipt of said identification impulse set concurrently and in synchronism with the predetermined portion of the impulses of the first impulse set to connect the calling one of said lines to the desired special service facility.

33. In a supervisory control arrangement having a series of control points for effecting selective connection thereof to selected ones of a plurality of remotely disposed units, an impulse transmitting unit at each of predetermined ones of said control points for transmitting concurrently a code set comprised of unit selecting impulses and a single unit-operating impulse, including means for synchronizing said single unit operating impulse with only a particular one of said set of unit selecting impulses, the code set for different ones of the remotely disposed units comprising a different number of unit selecting impulses, and a unit operating impulse synchronized with a correspondingly different one of the unit selecting impulses; means at said remote point for responding to said selecting impulses as received thereat to prepare a selection circuit for the unit indicated thereby, and unit operating means operative to complete the selection circuit for said selected unit only responsive to concurrent receipt of its operating impulse in synchronized relation with the preassigned one of the selecting impulses.

34. In an automatic telephone system, switching means for sequentially selecting a plurality of associated positions, an indicator unit at each position, means for transmitting a set of control signals to said switching means which includes a first means for transmitting a first set of selection impulses for advancing said switching means to a particular one of the positions and contemporaneously therewith at least one other indicator impulse which is synchronized with at least one impulse of the first set, and means for transmitting a second set of selection impulses and contemporaneously therewith an indicator selection impulse synchronized with a different impulse of its associated selection impulse set to effect selection of a different position, and means operative responsive to receipt of the different impulse sets in the proper synchronized relation to select and operate the particular one of the indicator devices indicated by the incoming impulse sets.

35. In a telephone exchange which terminates a plurality of subscriber lines and includes a plurality of restricted special service facilities for use by preferred ones of said subscriber lines, said subscriber lines being divided into a plurality of different classes, one of said classes being restricted from connection to special service facilities, a second of said classes being arranged for connection to one of said special service facilities, and a third one of said classes being arranged for connection to another of said special service facilities, each of said preferred subscribers lines having impulse transmitting means for gaining access to the assigned ones of said special service facilities including a first impulse means for transmitting a plurality of sets of digit-representing impulses, and an auxiliary means for transmitting a set of identification signals in synchronized relation with a predetermined portion of a selected one of said digit-representing impulse sets; said axiliary means for the preferred subscriber lines of said second class being operative to transmit identification signals in synchronized relation with a first portion of said selected digit-representing impulse set, and said auxiliary means for the preferred subscriber lines of said third class being operative to transmit identification signals in synchronized relation with a second portion of said selected digit-representing impulse set, said second portion of the impulse digit-representing set being different than said first portion, and means for extending a calling subscriber line to a restricted special service facility only responsive to receipt of the identification impulse set in synchronized relation with its preassigned portion of said selected digit-representing impulse set.

References Cited in the file of this patent

UNITED STATES PATENTS

| | | |
|---|---|---|
| 1,580,252 | Jacobsen | Apr. 13, 1920 |
| 1,738,624 | Wicks | Dec. 10, 1929 |
| 1,960,037 | Williams | May 22, 1934 |
| 2,005,595 | Roome | June 18, 1935 |
| 2,093,117 | Carpenter | Sept. 14, 1937 |
| 2,286,431 | Molnar | June 16, 1942 |
| 2,315,010 | Ostline | Mar. 30, 1943 |
| 2,333,039 | Peterson | Oct. 26, 1943 |
| 2,481,851 | Lomax | Sept. 13, 1949 |
| 2,491,291 | Voss | Dec. 13, 1949 |
| 2,518,210 | Wicks | Aug. 8, 1950 |
| 2,519,867 | Wicks | Aug. 22, 1950 |
| 2,530,845 | Voss | Nov. 21, 1950 |
| 2,544,944 | Wicks | Mar. 13, 1951 |
| 2,572,740 | Malthaner | Oct. 23, 1951 |
| 2,592,784 | Bakker | Apr. 15, 1952 |
| 2,619,546 | Myers | Nov. 25, 1952 |

UNITED STATES PATENT OFFICE

CERTIFICATE OF CORRECTION

Patent No. 2,807,669 September 24, 1957

Arne Oxaal

It is hereby certified that error appears in the printed specification of the above numbered patent requiring correction and that the said Letters Patent should read as corrected below.

Column 44, line 4, for "sad" read --said--; column 45, line 62, column 48, line 75, and column 49, line 20, for "subscriber", each occurrence, read --subscribers--; column 48, line 51, after "discriminating" insert --means--; column 50, line 26, for "axiliary" read --auxiliary--.

Signed and sealed this 14th day of January 1958.

(SEAL)
Attest:
KARL H. AXLINE

Attesting Officer

ROBERT C. WATSON
Commissioner of Patents